US012070946B2

(12) United States Patent
Miyakoshi et al.

(10) Patent No.: US 12,070,946 B2
(45) Date of Patent: Aug. 27, 2024

(54) HEAD UNIT AND INKJET RECORDING APPARATUS INCLUDING THE SAME

(71) Applicant: KYOCERA Document Solutions Inc., Osaka (JP)

(72) Inventors: Naoto Miyakoshi, Osaka (JP); Shuji Osaki, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 154 days.

(21) Appl. No.: 17/702,557

(22) Filed: Mar. 23, 2022

(65) Prior Publication Data

US 2022/0332110 A1 Oct. 20, 2022

(30) Foreign Application Priority Data

Apr. 14, 2021 (JP) ................................ 2021-068156

(51) Int. Cl.
*B41J 2/14* (2006.01)

(52) U.S. Cl.
CPC ...................................... *B41J 2/14* (2013.01)

(58) Field of Classification Search
CPC .... B41J 2/155; B41J 2/16585; B41J 2202/20; B41J 25/001; B41J 2202/21; B41J 29/02; B41J 2/16526; B41J 25/003; B41J 25/3086
See application file for complete search history.

(56) References Cited

U.S. PATENT DOCUMENTS

| | | | | |
|---|---|---|---|---|
| 2007/0071498 | A1* | 3/2007 | Ueda | B41J 2/175 399/302 |
| 2020/0238709 | A1 | 7/2020 | Tomioka et al. | |
| 2020/0247122 | A1 | 8/2020 | Sue | |

FOREIGN PATENT DOCUMENTS

| | | | |
|---|---|---|---|
| JP | 2020-116844 | A | 8/2020 |
| JP | 2020-121514 | A | 8/2020 |

* cited by examiner

*Primary Examiner* — Jannelle M Lebron
(74) *Attorney, Agent, or Firm* — Stein IP, LLC

(57) ABSTRACT

A head unit includes a recording head and a unit frame. The unit frame includes a main frame extending along a width direction orthogonal to a conveyance direction of a recording medium, and is configured to hold one or more recording heads on both side surfaces of the main frame. The main frame includes: a main body portion having a flat-plate shape and standing along the width direction; and bent portions formed by perpendicularly bending both end portions of the main body portion in the width direction. The unit frame includes a pair of reinforcing members provided at the bent portions. The reinforcing members each include a side wall portion opposed to the main body portion and a bottom surface portion provided so as to extend in a horizontal direction from a lower end portion of the side wall portion.

11 Claims, 18 Drawing Sheets

HEAD UNIT AND INKJET RECORDING APPARATUS INCLUDING THE SAME

INCORPORATION BY REFERENCE

This application is based on and claims the benefit of priority from Japanese Patent Application No. 2021-68156 filed on Apr. 14, 2021, the contents of which are hereby incorporated by reference.

BACKGROUND

The present disclosure relates to a head unit to be mounted to an inkjet recording apparatus and an inkjet recording apparatus including the same, and more particularly, to a mounting structure for mounting a recording head to a head unit.

A head unit to be mounted to an inkjet recording apparatus includes a recording head including a plurality of nozzles configured to eject ink onto a recording medium, for example, a sheet, and is configured to record an image on a recording medium. In a so-called line head printer with recording heads arranged such that inkjet ejection nozzles are arranged along an entire region of a recording medium in a width direction, a head unit including a plurality of recording heads forming a unit for each color is used.

SUMMARY

A head unit according to one aspect of the present disclosure includes a recording head and a unit frame. The recording head includes a plurality of nozzles configured to eject ink onto the recording medium. The unit frame includes a main frame extending along a width direction orthogonal to a conveyance direction of the recording medium, and is configured to hold one or more recording heads on both side surfaces of the main frame. The main frame includes: a main body portion having a flat-plate shape and standing along the width direction; and bent portions formed by perpendicularly bending both end portions of the main body portion in the width direction. The unit frame includes a pair of reinforcing members provided at the bent portions. The reinforcing members each include a side wall portion opposed to the main body portion and a bottom surface portion provided so as to extend in a horizontal direction from a lower end portion of the side wall portion. The reinforcing members are fixed to the main frame under a state in which a side end edge of the side wall portion is arranged along a bend portion defined between the main body portion and the bent portion and in which a side end edge of the bottom surface portion is arranged along an inner side surface of the bent portion.

DETAILED DESCRIPTION

Figure 1:
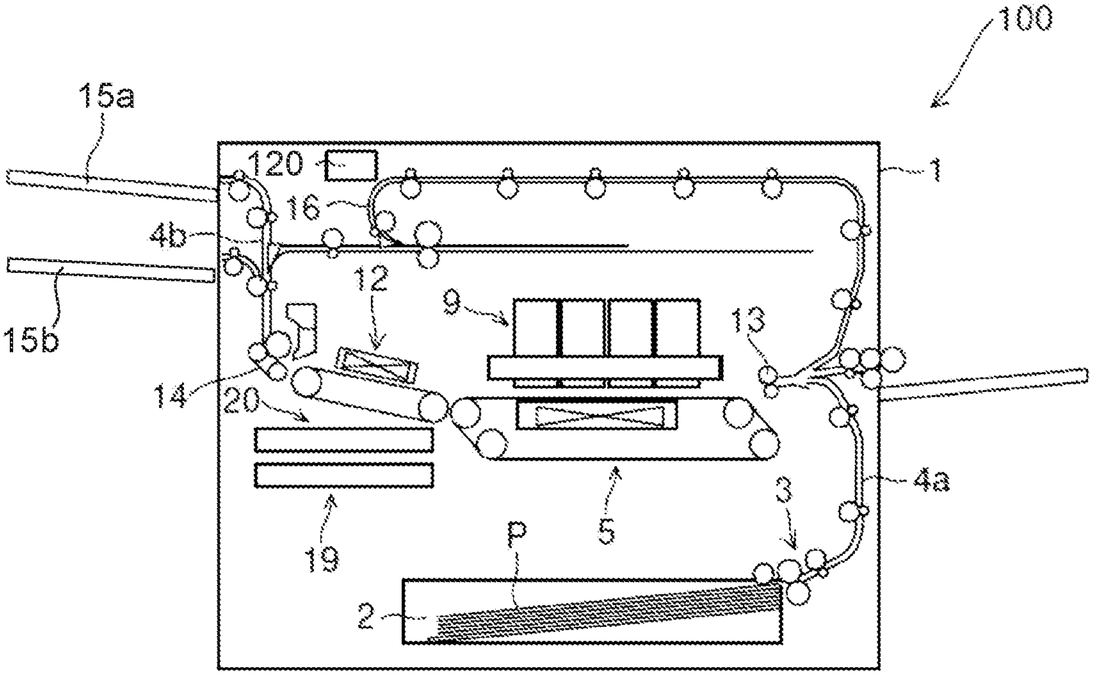
FIG. 1 is an explanatory view for illustrating a schematic configuration of a printer, which is an inkjet recording apparatus according to one embodiment of the present disclosure.

Now, an embodiment of the present disclosure is described with reference to the drawings. FIG. 1 is an explanatory view for illustrating a schematic configuration of a printer 100, which is an inkjet recording apparatus according to one embodiment of the present disclosure. The printer 100 includes a sheet feeding cassette 2, which is a sheet accommodating portion. The sheet feeding cassette 2 is arranged on a lower side inside a printer main body 1. The sheet feeding cassette 2 accommodates sheets P, which are an example of recording media.

A sheet feeding device 3 is arranged on a downstream side of the sheet feeding cassette 2 in a sheet conveyance direction, that is, on an upper right side of the sheet feeding cassette 2 in FIG. 1. With this sheet feeding device 3, the sheets P are separated and sent out one after another toward the upper right side of the sheet feeding cassette 2 in FIG. 1.

The printer 100 includes a first sheet conveyance passage 4*a* inside thereof. The first sheet conveyance passage 4*a* is located on the upper right side with respect to the sheet feeding cassette 2, which corresponds to a sheet-feeding direction of the sheet feeding cassette 2. The sheet P having been sent out from the sheet feeding cassette 2 is conveyed by the first sheet conveyance passage 4*a* vertically upward along a side surface of the printer main body 1.

A registration roller pair 13 is provided at a downstream end of the first sheet conveyance passage 4*a* in the sheet conveyance direction. Further, a first conveyance unit 5 and a recording portion 9 are arranged in proximity to a downstream side of the registration roller pair 13 in the sheet conveyance direction. The sheet P having been sent out from the sheet feeding cassette 2 passes through the first sheet conveyance passage 4*a* to reach the registration roller pair 13. The registration roller pair 13 sends out the sheet P toward the first conveyance unit 5 (in particular, first conveyance belt 8 described later) at the timing matching the timing of an ink ejection operation performed by the recording portion 9, while correcting skew feed of the sheet P.

The sheet P having been sent out to the first conveyance unit 5 by the registration roller pair 13 is conveyed by the first conveyance belt 8 to a position opposing the recording portion 9 (in particular, recording heads 17*a* to 17*c* described later). Through ejection of ink from the recording portion 9 onto the sheet P, an image is recorded on the sheet P. In this case, the ejection of the ink in the recording portion 9 is controlled by a controller 120 provided inside the printer 100.

A second conveyance unit 12 is arranged on a downstream side of the first conveyance unit 5 in the sheet conveyance direction (left side in FIG. 1). The sheet P having the image recorded thereon by the recording portion 9 is sent to the second conveyance unit 12. The ink having been ejected onto a surface of the sheet P is dried while passing through the second conveyance unit 12.

A decurler portion 14 is provided in the vicinity of a left side surface of the printer main body 1 on a downstream side of the second conveyance unit 12 in the sheet conveyance direction. The sheet P having the ink dried by the second conveyance unit 12 is sent to the decurler portion 14, and the curl in the sheet P is corrected.

A second sheet conveyance passage 4*b* is provided on a downstream side of the decurler portion 14 in the sheet conveyance direction (upper side in FIG. 1). When duplex recording is not to be performed, the sheet P having passed through the decurler portion 14 passes through the second sheet conveyance passage 4*b* and then is discharged to a sheet discharge tray 15*a* provided outside the left side surface of the printer 100. A sub discharge tray 15*b* configured to discharge an unnecessary sheet P suffered from, for example, poor printing (waste sheet) is provided below the sheet discharge tray 15*a*.

A turn-over conveyance passage 16 for the duplex recording is provided at an upper portion of the printer main body 1 above the recording portion 9 and the second conveyance unit 12. When the duplex recording is to be performed, the sheet P having been subjected to the recording on one surface (first surface) of the sheet P and having passed through the second conveyance unit 12 and the decurler portion 14 is sent to the turn-over conveyance passage 16 through the second sheet conveyance passage 4*b*.

A conveyance direction of the sheet P having been sent to the turn-over conveyance passage 16 is then switched for recording on another surface (second surface) of the sheet P. Then, the sheet P passes through the upper portion of the printer main body 1 to be sent to the right side, and is sent again to the first conveyance unit 5 via the registration roller pair 13 under a state in which the second surface of the sheet P faces upward. In the first conveyance unit 5, the sheet P is conveyed to the position opposing the recording portion 9. Through ejection of ink from the recording portion 9, an image is recorded on the second surface. The sheet P having been subjected to the duplex recording passes through the second conveyance unit 12, the decurler portion 14, and the second sheet conveyance passage 4*b* in the stated order to be discharged to the sheet discharge tray 15*a*.

Further, a maintenance unit 19 and a cap unit 20 are arranged below the second conveyance unit 12. At the time of performing purging, the maintenance unit 19 horizontally moves to a position below the recording portion 9 to wipe ink having been pushed out from ink ejection ports of the recording heads and collects the ink having been wiped. The "purging" refers to an operation of forcibly pushing out the ink from the ink ejection ports of the recording heads in order to discharge thickened ink, foreign matters, and air bubbles inside the ink ejection ports. At the time of capping ink ejection faces of the recording heads, the cap unit 20 horizontally moves to a position below the recording portion 9 and further moves upward to be mounted to the lower surfaces of the recording heads.

Figure 2:
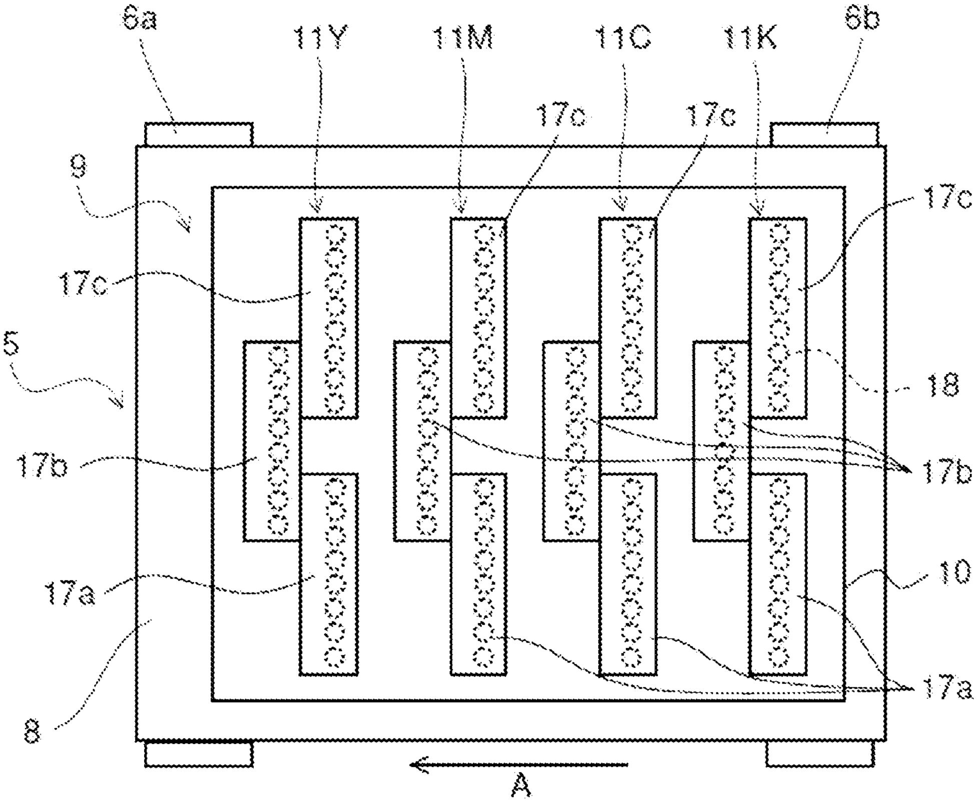
FIG. 2 is a plan view of a recording portion included in the printer.

FIG. 2 is a plan view of the recording portion 9. The recording portion 9 includes a head housing 10 and line heads 11Y, 11M, 11C, and 11K. The line heads 11Y to 11K are held by the head housing 10 at such a height that a predetermined distance (for example, 1 mm) is defined with respect to a conveyance surface of the first conveyance belt 8 having an endless shape, which extends in a tensioned state around a plurality of rollers including a driving roller 6*a*, a driven roller 6*b*, and a tension roller (not shown). The driving roller 6*a* allows the first conveyance belt 8 to run in the conveyance direction of the sheet P (arrow A direction).

The line heads 11Y to 11K each include a plurality of (three in this embodiment) recording heads 17*a* to 17*c*. The recording heads 17*a* to 17*c* are arrayed in a staggered pattern along a sheet width direction (arrow BB' direction) orthogonal to the sheet conveyance direction (arrow A direction). The recording heads 17*a* to 17*c* each include a plurality of ink ejection ports 18 (nozzles). The ink ejection ports 18 are arranged side by side at equal intervals in the width direction of the recording head, that is, in the sheet width direction (arrow BB' direction). Inks of respective colors including yellow (Y), magenta (M), cyan (C), and black (K) are ejected from the line heads 11Y to 11K through the ink ejection ports 18 of the recording heads 17*a* to 17*c* toward the sheet P conveyed on the first conveyance belt 8.

Figure 3:
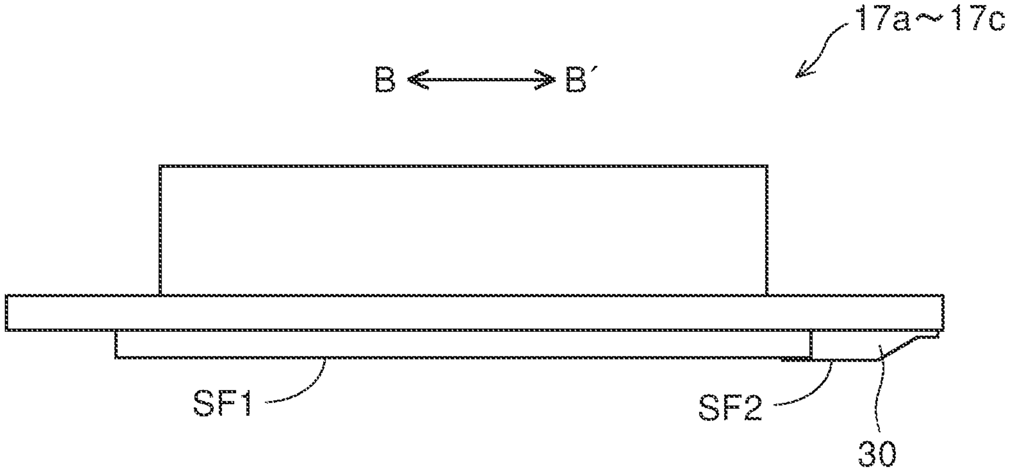
FIG. 3 is a side view of a recording head forming a line head of the recording portion.
Figure 4:
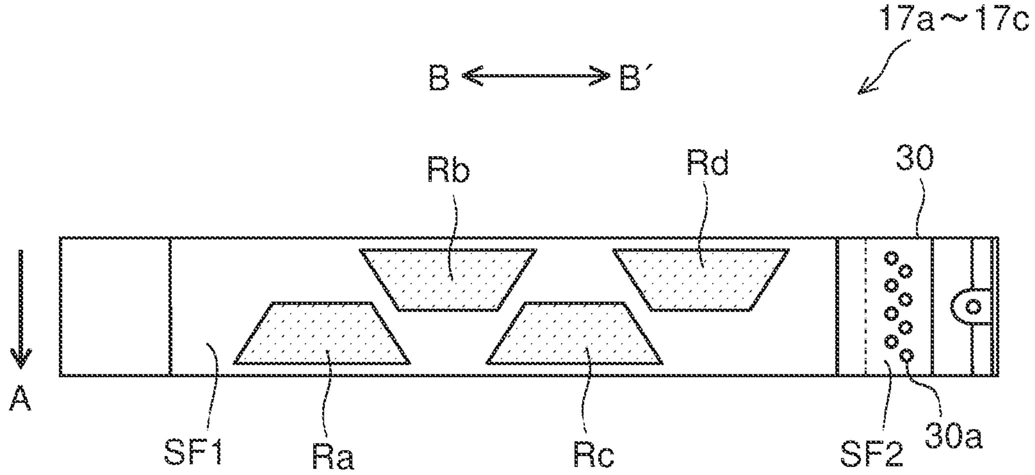
FIG. 4 is a plan view of the recording head as seen from an ink ejection face side.

FIG. 3 is a side view of the recording heads 17*a* to 17*c* forming the line heads 11Y to 11K of the recording portion 9. FIG. 4 is a plan view of the recording heads 17*a* to 17*c* as seen from an ink ejection face SF1 side. The recording heads 17*a* to 17*c* have the same shape and configuration. Thus, in FIG. 3 and FIG. 4, the recording heads 17*a* to 17*c* are illustrated in one drawing. As illustrated in FIG. 3 and FIG. 4, the ink ejection face (nozzle face) SF1 of the recording heads 17*a* to 17*c* has a plurality of (four blocks in this embodiment) nozzle regions Ra to Rd each having a large number of ink ejection ports 18 (see FIG. 2) arrayed therein. The ink ejection face SF1 is made of, for example, SUS (stainless steel).

The recording heads 17*a* to 17*c* forming the line heads 11Y to 11K receive supply of inks of four colors (yellow, magenta, cyan, and black), which are respectively designated for the line heads 11Y to 11K, from a liquid supply mechanism (not shown).

In response to a control signal from the controller 120 (see FIG. 1), and in accordance with image data received from an external computer, the recording heads 17*a* to 17*c* eject the ink, from the ink ejection ports 18 toward the sheet P being conveyed in a state of being attracted to and held on the conveyance surface of the first conveyance belt 8. With this operation, a color image which is formed by superimposing the ink images of four colors including yellow, magenta, cyan, and black is formed on the sheet P on the first conveyance belt 8. Further, a cleaning liquid supply portion 30 configured to supply a cleaning liquid is provided at one end portion of the recording heads 17*a* to 17*c* in a longitudinal direction (arrow BB' direction) orthogonal to the sheet conveyance direction (arrow A direction). The cleaning liquid supply portion 30 has a large number of cleaning liquid supply ports 30*a*.

In the printer 100, in order to clean the ink ejection faces SF1 of the recording heads 17*a* to 17*c*, at the time of starting printing after a long period of suspension and during breaks of printing operations, a recovery operation for the recording heads 17*a* to 17*c*, specifically, an operation of pushing out (purging) the ink from the ink ejection ports 18 of all the recording heads 17*a* to 17*c* and then supplying the cleaning liquid from the cleaning liquid supply ports 30*a* to cleaning liquid supply faces SF2 and wiping off the ink ejected to the ink ejection face SF1 together with the cleaning liquid with a wiper (not shown) is performed, to thereby prepare for the next printing operation. The ink and the cleaning liquid having been wiped off from the ink ejection face SF1 is collected by an ink receiving portion (not shown).

Figure 5:
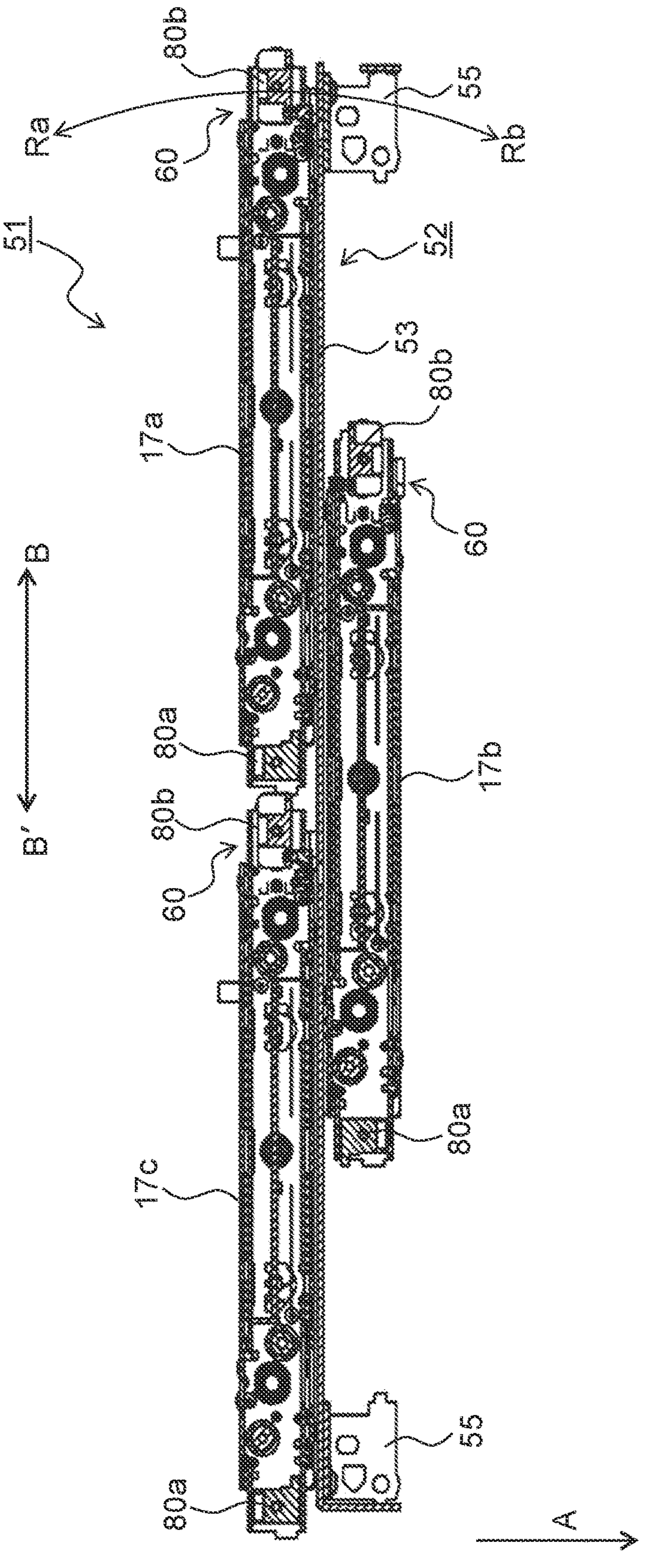
FIG. 5 is a plan sectional view of the head unit as seen from above.
Figure 6:
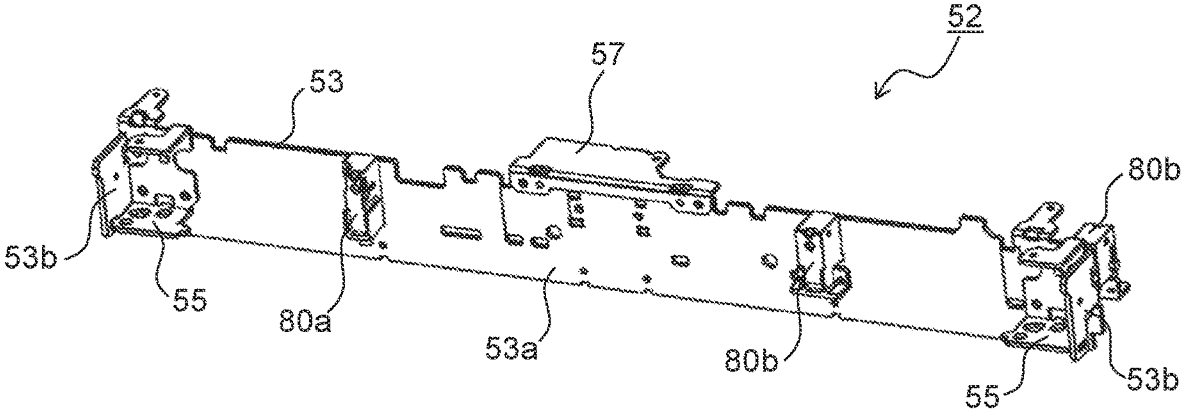
FIG. 6 is a perspective view of a unit frame forming the head unit.
Figure 7:
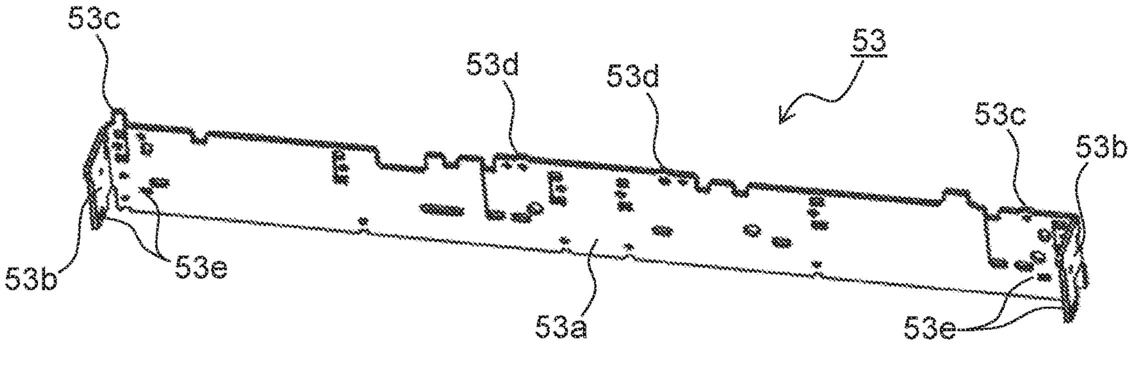
FIG. 7 is a perspective view of a main frame forming the unit frame.

Next, a configuration of ahead unit 51 of the printer 100 is described. FIG. 5 is a plan sectional view of the head unit 51 as seen from above. FIG. 6 is a perspective view of a unit frame 52 forming the head unit 51. FIG. 7 is a perspective view of a main frame 53 forming the unit frame 52. The head unit 51 includes the recording heads 17*a* to 17*c* and the unit frame 52. The unit frame 52 is configured to hold the recording heads 17*a* to 17*c* such that the recording heads 17*a* to 17*c* are individually removable.

The recording heads 17*a* to 17*c* are arrayed in a staggered pattern on both side surfaces of the unit frame 52 along the sheet width direction (arrow BB' direction). More specifically, the recording heads 17*a* and 17*c* are held on an upstream side of the unit frame 52 in the sheet conveyance direction (arrow A direction), and the recording head 17*b* is held on a downstream side.

The unit frame 52 includes the main frame 53, first reinforcing members 55, and a second reinforcing member 57. As illustrated in FIG. 7, the main frame 53 includes a main body portion 53*a* and bent portions 53*b*. The main body portion 53*a* having a flat-plate shape extends in an up-and-down direction and in the sheet width direction and is opposed to side surfaces of the recording heads 17*a* to 17*c*. The bent portions 53*b* are formed by perpendicularly bending both end portions of the main body portion 53*a* in the sheet width direction. First head mounting members 80*a* and second head mounting members 80*b* which are configured to hold the recording heads 17*a* to 17*c* are fixed to the main body portion 53*a* at predetermined locations. The first head mounting members 80*a* and the second head mounting members 80*b* are each an aluminum block member formed by aluminum die-casting.

The first head mounting members 80*a* each include a support shaft boss 81 (see FIG. 16) configured to support one end portion of the recording heads 17*a* to 17*c* in the longitudinal direction (end portion in the arrow B' direction) such that the recording heads 17*a* to 17*c* are rotatable in the horizontal direction. The support structure for supporting the recording heads 17*a* to 17*c* with the first head mounting member 80*a* is described later.

The second head mounting members 80*b* are each configured to support another end portion of the recording heads 17*a* to 17*c* in the longitudinal direction (end portion in the arrow B direction). Head angle adjustment mechanisms 60 are each configured to perform angle adjustment (alignment adjustment) of the recording heads 17*a* to 17*c* in the horizontal direction with respect to the unit frame 52 by moving the end portion of the recording heads 17*a* to 17*c* (end portion in the arrow B direction) in an Ra direction or an Rb direction with respect to the unit frame 52. A specific configuration of the head angle adjustment mechanism 60 is described later.

Further, one end portion of the head unit 51 in the longitudinal direction (end portion in the arrow B' direction) is support so as to be pivotable in the horizontal direction with respect to a main body frame 101 (see FIG. 12) of the printer 100. A unit angle adjustment mechanism 110 (see FIG. 13) configured to perform angle adjustment of the heat unit 51 with respect to the main body frame 101 is arranged at another end portion of the head unit 51 in the longitudinal direction (end portion in the arrow B direction).

Figure 8:
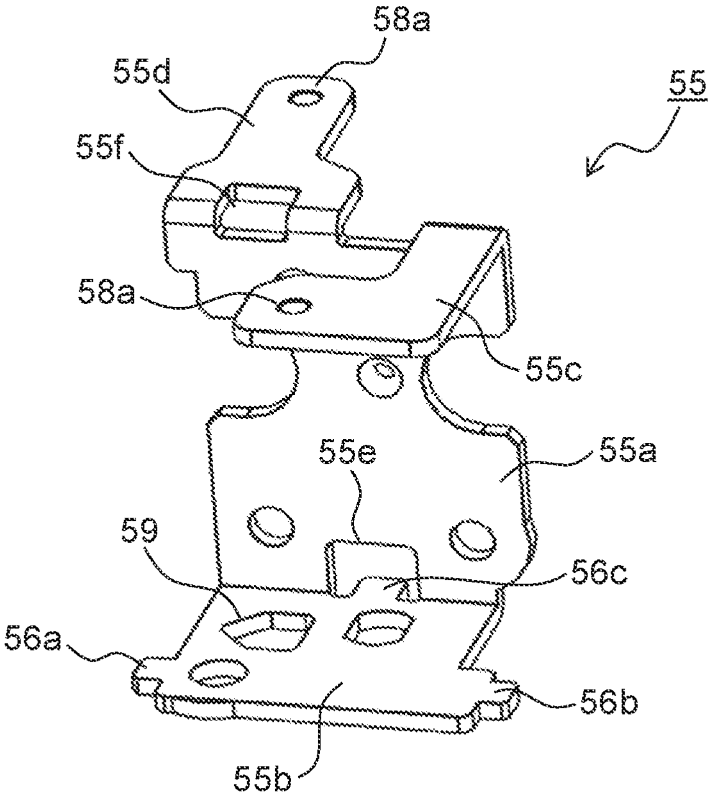
FIG. 8 is a perspective view of a first reinforcing member forming the unit frame.
Figure 9:
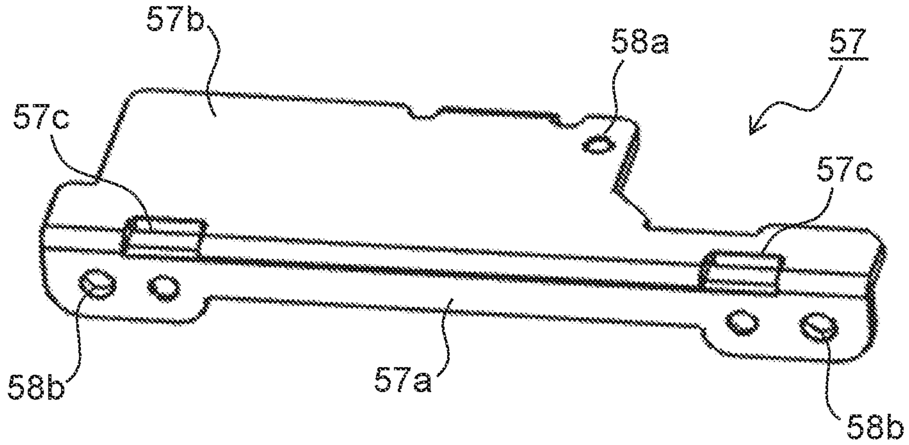
FIG. 9 is a perspective view of a second reinforcing member forming the unit frame.

FIG. 8 and FIG. 9 are perspective views of the first reinforcing member 55 and the second reinforcing member 57 each forming the unit frame 52. The first reinforcing member 55 is formed by bending a metal plate into a predetermined shape, and includes a side wall portion 55*a*, a bottom surface portion 55*b*, a first coupling piece 55*c*, and a second coupling piece 55*d*.

The side wall portion 55*a* is fixed to the main body portion 53*a* of the main frame 53. The bottom surface portion 55*b* is provided so as to extend in the horizontal direction from a lower end portion of the side wall portion

55*a* toward one side (front side in FIG. 8), and includes first engagement protrusions 56*a* and 56*b*, a second engagement protrusion 56*c*, and a unit positioning hole 59. The first engagement protrusions 56*a* and 56*b* project from side end edges on one side (left side in FIG. 8) and another side (right side in FIG. 8) of the bottom surface portion 55*b*, respectively, and the second engagement protrusion 56*c* projects from the lower end portion of the side wall portion 55*a* through an opening portion 55*e* toward a side opposite to the bottom surface portion 55*b* (back side in FIG. 8). The unit positioning hole 59 engages with a support shaft 102 (see FIG. 12) of the main body frame 101 when the first reinforcing member 55 is mounted on a fulcrum side (left side in FIG. 6) of the unit frame 52.

The first coupling piece 55*c* and the second coupling piece 55*d* are provided so as to extend in the horizontal direction from an upper end portion of the side wall portion 55*a* toward one side (front side in FIG. 8) and another side (back side in FIG. 8), respectively. The first coupling piece 55*c* and the second coupling piece 55*d* each have a screw hole 58*a* for fixing by screw a flow passage structure 91 and a reinforcing sheet metal 92 (see FIG. 27), which is configured to supply liquid such as ink or a cleaning liquid to the recording heads 17*a* to 17*c*, to the unit frame 52. A ridge portion defined between the side wall portion 55*a* and the second coupling piece 55*d* has a first engagement hole 55*f* to be engaged with a positioning protrusion 53*c* (see FIG. 7) formed at an upper end portion of the main frame 53.

The second reinforcing member 57 is formed by bending a metal plate into a predetermined shape, and includes a support portion 57*a* and an upper surface portion 57*b*. The support portion 57*a* is fixed to the main body portion 53*a* of the main frame 53. The support portion 57*a* has a screw hole 58*b* for fixing to the main body portion 53*a*. The upper surface portion 57*b* is provided so as to extend in the horizontal direction from an upper end portion of the support portion 57*a*, and has a screw hole 58*a* for fixing by screw the flow passage structure 91 and the reinforcing sheet metal 92 (see FIG. 27) to the unit frame 52. A ridge portion defined between the support portion 57*a* and the upper surface portion 57*b* has a second engagement hole 57*c* to be engaged with a positioning protrusion 53*d* (see FIG. 7) formed at an upper end portion of the main frame 53.

Figure 10:
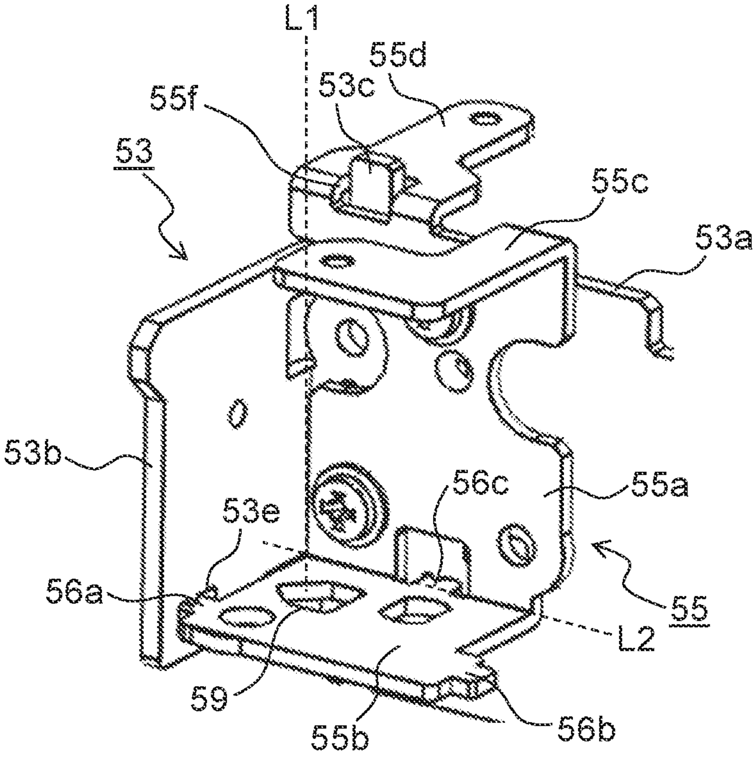
FIG. 10 is a perspective view for illustrating a state in which the first reinforcing member is mounted to a bent portion on a pivot fulcrum side of the main frame.
Figure 11:
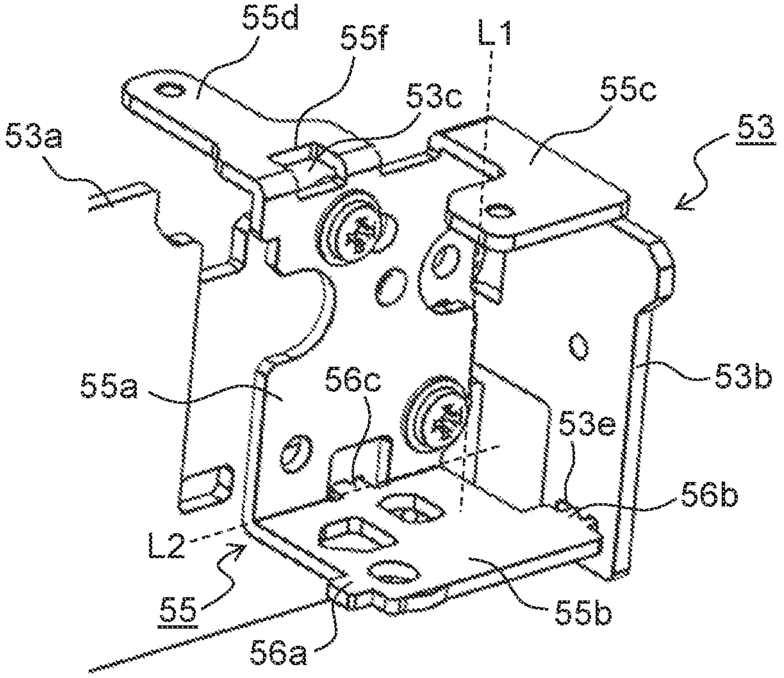
FIG. 11 is a perspective view for illustrating a state in which the first reinforcing member is mounted to a bent portion on a pivot end side of the main frame.

FIG. 10 and FIG. 11 are perspective views for illustrating a state in which the first reinforcing members 55 are mounted to the bent portions 53*b* on the pivot fulcrum side (left side in FIG. 6) and the pivot end side (right side in FIG. 6) of the main frame 53, respectively. As illustrated in FIG. 10, on the pivot fulcrum side of the main frame 53, the first reinforcing member 55 is positioned with respect to the main frame 53 by engaging the first engagement hole 55*f* of the first reinforcing member 55 with the positioning protrusion 53*c*.

In this manner, the side end edge of the side wall portion 55*a* of the first reinforcing member 55 on one side (left side in FIG. 8) is arranged along a ridge line L1 being a bend portion defined between the main body portion 53*a* and the bent portion 53*b*. Further, the side end edge of the bottom surface portion 55*b* on one side (left side in FIG. 8) is arranged along an inner side surface of the bent portion 53*b*. Then, the first engagement protrusion 56*a* of the first reinforcing member 55 is engaged with the engagement hole 53*e* formed in the bent portion 53*b*, and the second engagement protrusion 56*c* is engaged with the engagement hole 53*e* (see FIG. 7) formed in the main body portion 53*a*, respectively. In this state, the side wall portion 55*a* is fixed by screw to the main body portion 53*a* so that mounting of the first reinforcing member 55 is completed.

As illustrated in FIG. 11, on the pivot end side of the main frame 53, the first reinforcing member 55 is positioned with respect to the main frame 53 by engaging the first engagement hole 55*f* of the first reinforcing member 55 with the positioning protrusion 53*c*. In this manner, the side end edge of the side wall portion 55*a* of the first reinforcing member 55 on another side (right side in FIG. 8) is arranged along the ridge line L1 being a bend portion defined between the main body portion 53*a* and the bent portion 53*b*. Further, the side end edge of the bottom surface portion 55*b* on another side (right side in FIG. 8) is arranged along an inner side surface of the bent portion 53*b*. Then, the first engagement protrusion 56*b* of the first reinforcing member 55 is engaged with the engagement hole 53*e* formed in the bent portion 53*b*, and the second engagement protrusion 56*c* is engaged with the engagement hole 53*e* (see FIG. 7) formed in the main body portion 53*a*, respectively. In this state, the side wall portion 55*a* is fixed by screw to the main body portion 53*a* so that mounting of the first reinforcing member 55 is completed.

In this embodiment, the first reinforcing member 55 is assembled to the main frame 53 such that the ridge line L1 being the bend portion defined between the main body portion 53*a* and the bent portion 53*b* of the main frame 53 and a ridge line L2 being a bend portion defined between the side wall portion 55*a* and the bottom surface portion 55*b* of the first reinforcing member 55 are orthogonal to each other. Further, the first engagement protrusions 56*a* and 56*b* and the second engagement protrusion 56*c* formed on the bottom surface portion 55*b* of the first reinforcing member 55 are inserted into the engagement holes 53*e* of the main frame 53. In this manner, the rigidity of the both end portions of the assembled unit frame 52 in the up-and-down direction and in the width direction can be improved.

Further, the first reinforcing members 55 having the same shape are mounted on the pivot fulcrum side and the pivot end side of the main frame 53, respectively. Thus, erroneous mounting can be prevented as compared to a case in which different members are mounted, thereby improving the ease of operation of mounting. Further, the number of members can be reduced, thereby facilitating management of members.

Figure 12:
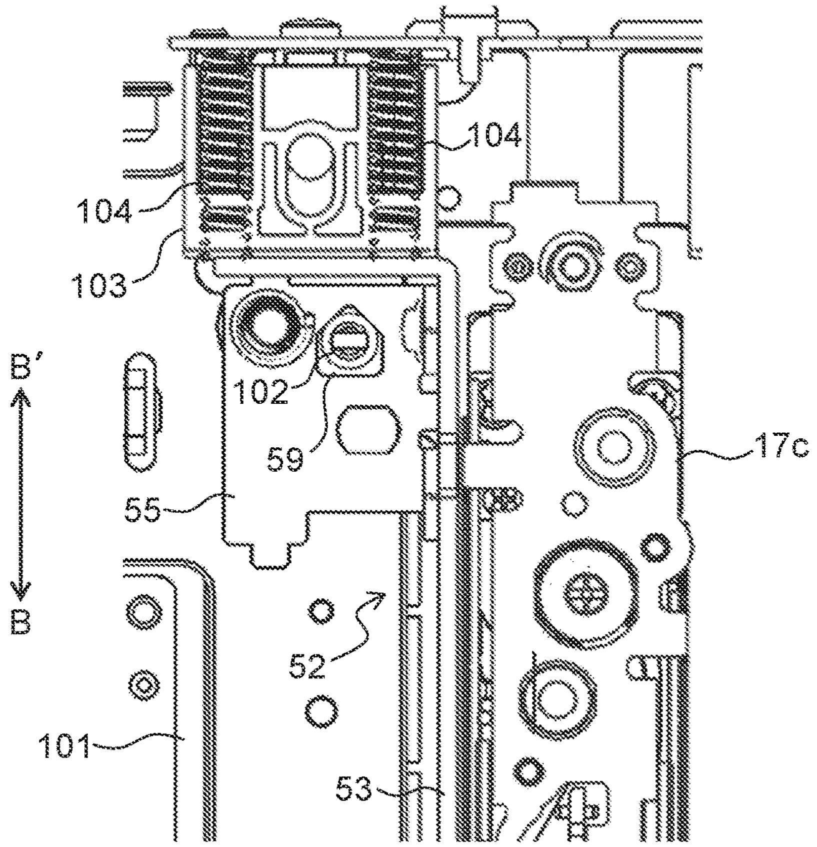
FIG. 12 is a plan view of a configuration of an engagement portion between the pivot fulcrum side of the unit frame and a main body frame of the printer as seen from above.

FIG. 12 is a plan view of a configuration of an engagement portion between the pivot fulcrum side (left side in FIG. 6) of the unit frame 52 and the main body frame 101 of the printer 100 as seen from above. As illustrated in FIG. 12, on the pivot fulcrum side of the unit frame 52, the unit positioning hole 59 of the first reinforcing member 55 is engaged with the support shaft 102 of the main body frame 101. Further, on the main body frame 101, a pressing member 103 is arranged adjacent to the unit frame 52. The pressing member 103 is urged by two coil springs 104 in a direction of approaching the unit frame 52.

With this configuration, the unit frame 52 is pressed by the pressing member 103 toward the pivot end side (arrow B direction) so that two sides of the unit positioning hole 59 having a pentagonal shape (home-base shape) adjacent to each other over an apex is brought into press-contact with the support shaft 102. Thus, positioning of the unit frame 52 in the longitudinal direction (arrow BB' direction) can be performed easily and reliably.

Figure 13:
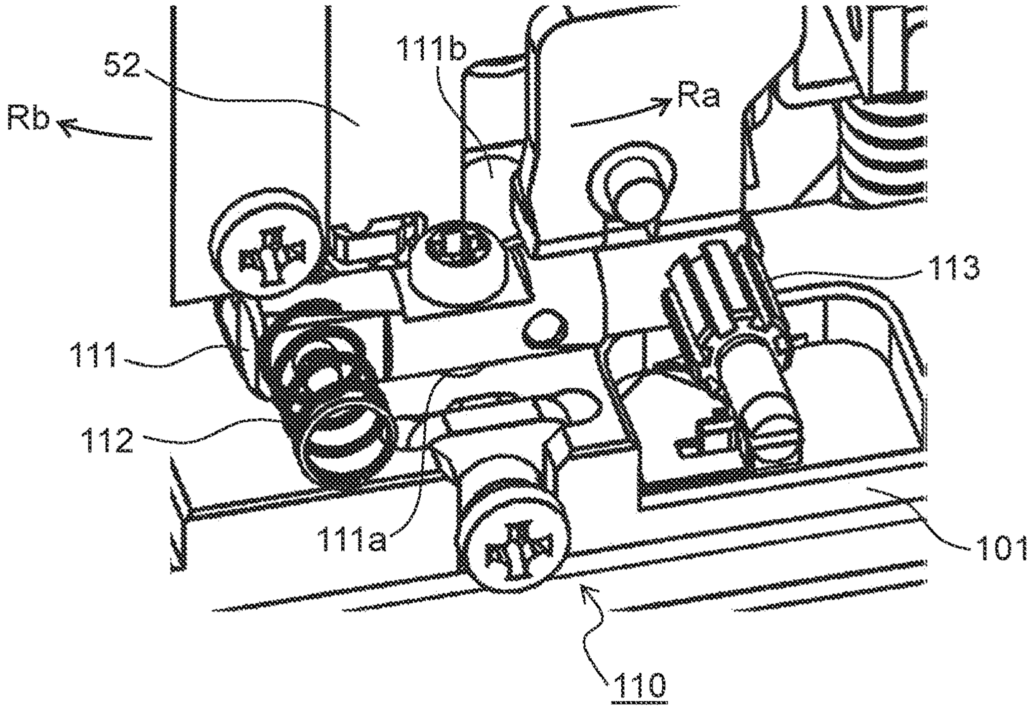
FIG. 13 is a perspective view for illustrating a configuration of a unit angle adjustment portion provided on the pivot end side of the unit frame.

FIG. 13 is a perspective view for illustrating a configuration of the unit angle adjustment mechanism 110 provided on the pivot end side of the unit frame 52. The unit angle adjustment mechanism 110 is arranged close to the side surface of the unit frame 52 on the pivot end side, and includes an angle adjustment member 111, a compression spring 112, and an operation member 113. Further, the unit frame 52 is urged by an urging mechanism (not shown) in the Ra direction about the support shaft 102 (see FIG. 12).

The angle adjustment member 111 is a rod-shaped member extending in the horizontal direction, and includes an adjustment rotation shaft 111*a* and a head contact portion 111*b*. The compression spring 112 urges the angle adjustment member 111 in a clockwise direction about the adjustment rotation shaft 111*a*. The operation member 113 is rotatably supported on the main body frame 101. Rotation of the operation member 113 in a forward direction or a reverse direction causes the operation member 113 to move in a direction of coming into contact with or separating away from one end portion of the angle adjustment member 111.

When the operation member 113 is forwardly rotated so as to move in the direction of coming closer to the angle adjustment member 111, one end portion of the angle adjustment member 111 is pressed so that the angle adjustment member 111 rotates in a counterclockwise direction against an urging force of the compression spring 112. As a result, the unit frame 52 is pressed by the head contact portion 111*b* and rotates in the Rb direction against an urging force of the urging mechanism. Meanwhile, when the operation member 113 is reversely rotated so as to move in the direction of separating away from the angle adjustment member 111, the angle adjustment member 111 rotates in the clockwise direction by the urging force of the compression spring 112. As a result, the head contact portion 111*b* moves in the direction of separating away from the unit frame 52 so that the unit frame 52 rotates in the Ra direction by the urging force of the urging mechanism.

Figure 14:
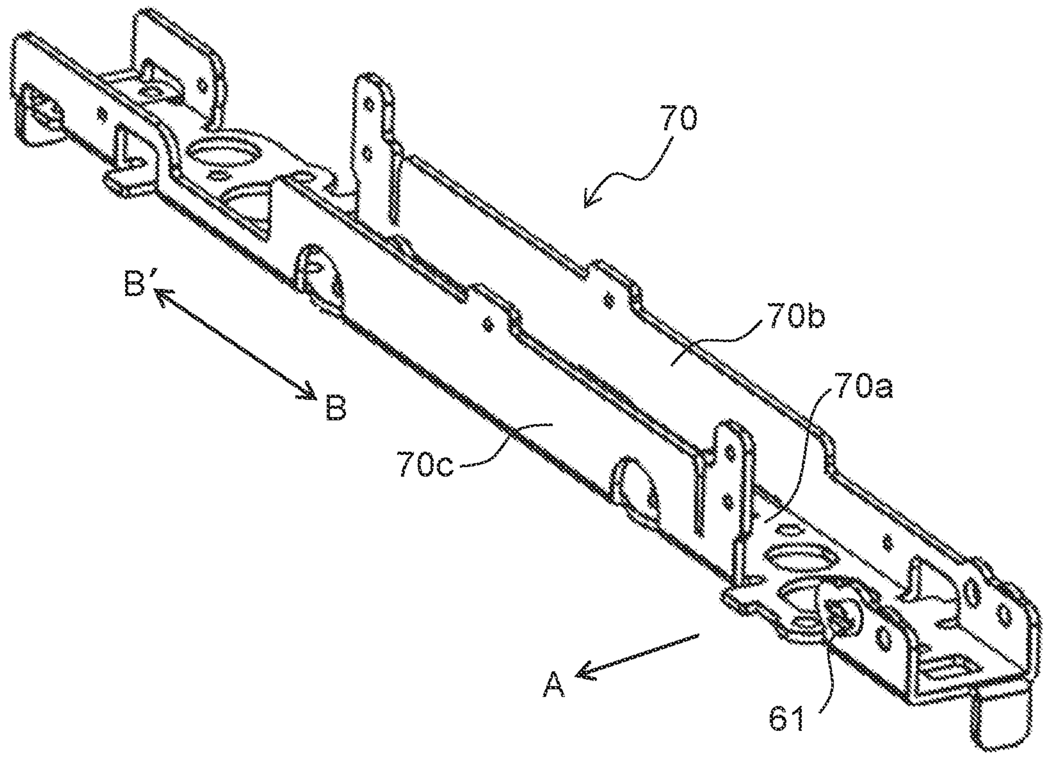
FIG. 14 is a perspective view of a head-side frame to be mounted to the recording head.

FIG. 14 is a perspective view of a head-side frame 70 to be mounted to the recording heads 17*a* to 17*c*. The head-side frame 70 is formed by bending a metal plate into a U-shape in sectional view, and includes a flat portion 70*a* and side-surface portions 70*b* and 70*c*. The flat portion 70*a* extends in the sheet width direction (arrow BB' direction). The side-surface portions 70*b* and 70*c* stand upright from side end edges of the flat portion 70*a* in the longitudinal direction. The head-side frame 70 is supported so as to be pivotable in the horizontal direction, with one side (left far side in FIG. 14) in the longitudinal direction with respect to the unit frame 52 serving as a pivot fulcrum and another side (right near side in FIG. 14) serving as a pivot end. On the pivot end side of the side-surface portion 70*c*, a first angle adjustment screw 61 for adjusting an angle of the head-side frame 70 in the horizontal direction (Ra and Rb directions) with respect to the unit frame 52 is threadedly inserted.

Figure 15:
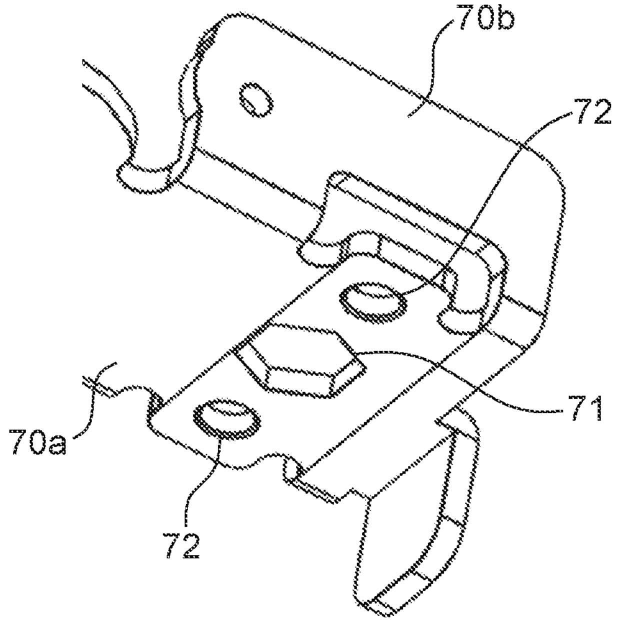
FIG. 15 is a partial enlarged view of an end portion of the head-side frame on the pivot fulcrum side as seen from below.

FIG. 15 is a partial enlarged view of the pivot fulcrum side of the head-side frame 70 as seen from below. As illustrated in FIG. 15, a head positioning hole 71 and adjustment screw mounting holes 72 are formed at an end portion of the flat portion 70*a* on the pivot fulcrum side. The head positioning hole 71 has a hexagonal shape. The adjustment screw mounting holes 72 receive height adjustment screws 75*a* and 75*b*, which are described later, to be threadedly insert thereinto.

Figure 16:
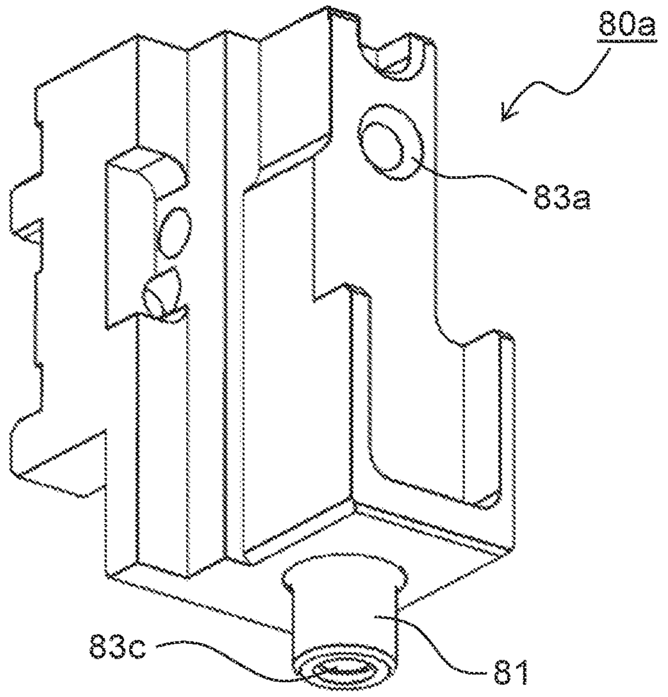
FIG. 16 is a perspective view of the first head mounting member to be arranged on the pivot fulcrum side of the head-side frame.

FIG. 16 is a perspective view of the first head mounting member 80*a* to be arranged on the pivot fulcrum side of the head-side frame 70. The first head mounting member 80*a* has the support shaft boss 81 and screw holes 83*a* to 83*c*. The support shaft boss 81 is inserted into the head positioning hole 71 of the head-side frame 70 to serve as a pivot fulcrum of the head-side frame 70. A screw 77*a* for fixing a flat spring 76 (refer to FIG. 18 for both) to the first head mounting member 80*a* is fastened to the screw hole 83*a*. A screw (not shown) for fixing the first head mounting member 80*a* to the main frame 53 is fastened to the screw hole 83*b* (see FIG. 18). The screw hole 83*c* is formed along an axial center of the support shaft boss 81, and a head fixing pin 73 (see FIG. 18) for fixing the recording heads 17*a* to 17*c* is fastened to the screw hole 83*c*.

Figure 17:
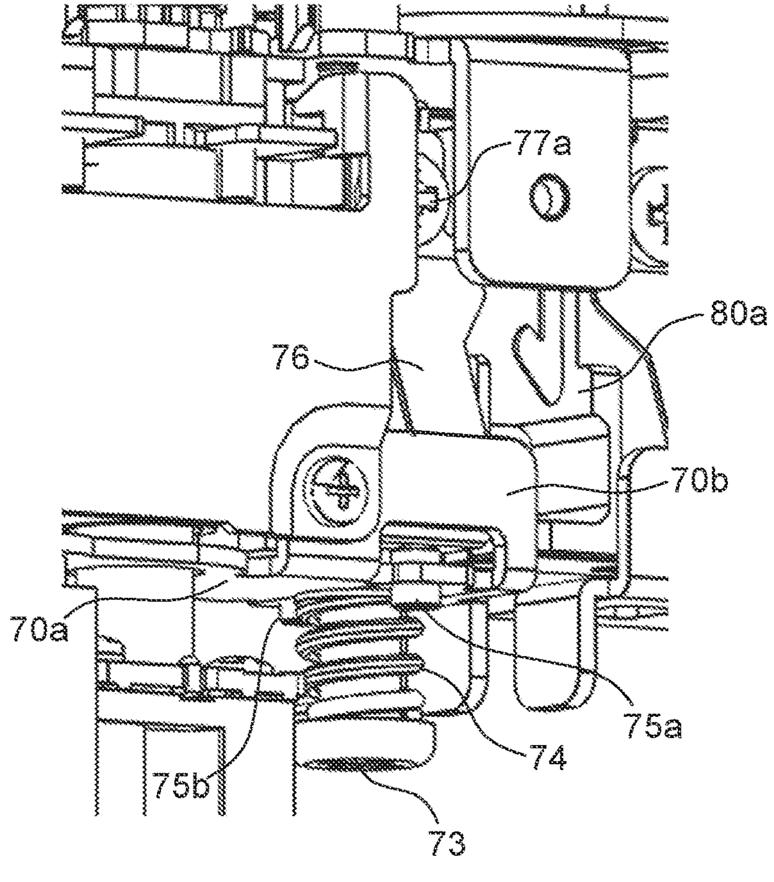
FIG. 17 is a perspective view for illustrating a configuration of a coupling portion between the pivot fulcrum side of the head-side frame and the unit frame.
Figure 18:
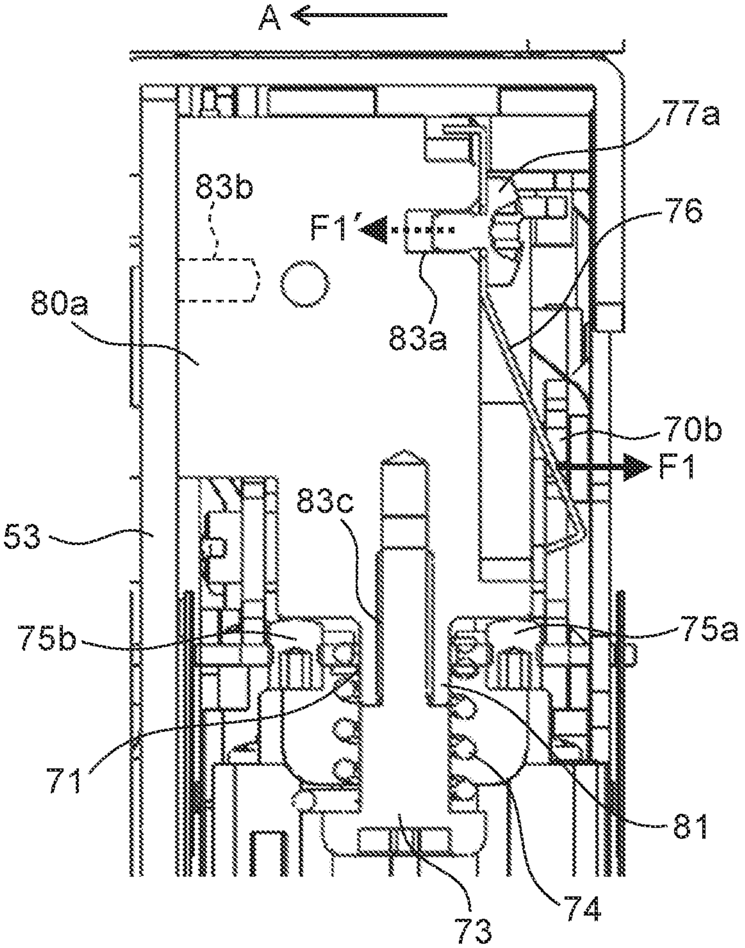
FIG. 18 is a side sectional view of the coupling portion between the pivot fulcrum side of the head-side frame and the unit frame taken along a direction orthogonal to a longitudinal direction.

FIG. 17 is a perspective view for illustrating a configuration of a coupling portion between the pivot fulcrum side of the head-side frame 70 and the unit frame 52. FIG. 18 is a side sectional view of the coupling portion between the pivot fulcrum side of the head-side frame 70 and the unit frame 52 taken along a direction orthogonal to the longitudinal direction. As illustrated in FIG. 17 and FIG. 18, the support shaft boss 81 of the first head mounting member 80*a* is inserted from above the head positioning hole 71 of the head-side frame 70. Further, the head fixing pin 73 is fastened through the head positioning hole 71 from below the head-side frame 70. A head fixing spring 74 is sandwiched between the head fixing pin 73 and the head-side frame 70. In this manner, the head-side frame 70 is held in press-contact with the first head mounting member 80*a* by an urging force of the head fixing spring 74.

Further, the height adjustment screws 75*a* and 75*b* are threadedly inserted into the adjustment screw mounting holes 72 of the head-side frame 70 from below. When the height adjustment screws 75*a* and 75*b* are rotated in a forward direction (clockwise direction), the height adjustment screws 75*a* and 75*b* project upward to push up a lower surface of the first head mounting member 80*a*. As a result, the head-side frame 70 moves downward against the urging force of the head fixing spring 74. When the height adjustment screws 75*a* and 75*b* are rotated in a reverse direction (counterclockwise direction), the height adjustment screws 75*a* and 75*b* retreat downward so that the head-side frame 70 moves upward by the urging force of the head fixing spring 74.

Further, the flat spring 76 is mounted on a side surface (right side surface in FIG. 18) of the first head mounting member 80*a* on a side opposite to an opposing surface with respect to the main frame 53. An upper end portion of the flat spring 76 is fixed with the screw 77*a* to the first head mounting member 80*a*, and a lower end portion of the flat spring 76 abuts against an inner side surface of the side-surface portion 70*b* of the head-side frame 70. In this manner, the head-side frame 70 is urged in a direction of separating away from the main frame 53 by the urging force of the flat spring 76, thereby being capable of maintaining a fixed positional relationship between the unit frame 52 and the head-side frame 70 in the conveyance direction (arrow A direction).

In this case, a pressing force F1 acts on the head-side frame 70 from the flat spring 76 so that a force F1' acts on the first head mounting member 80*a* from the flat spring 76 as a counteraction of the pressing force F1. That is, a force relationship of the action and the counteraction is completed between the first head mounting member 80*a* and the head-side frame 70, and a force applied by the flat spring 76 does not directly act on the main frame 53. Thus, deformation of the main frame 53 can be prevented.

Figure 19:
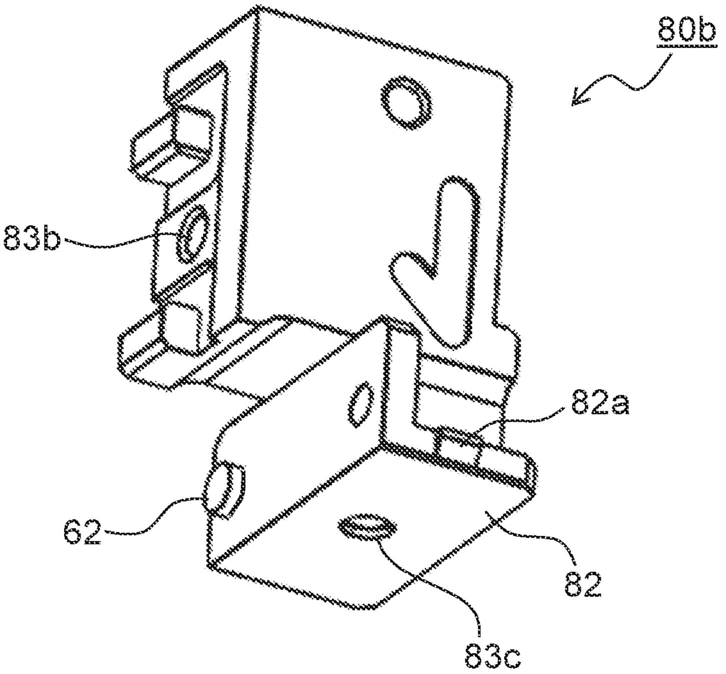
FIG. 19 is a perspective view of a second head mounting member to be arranged on the pivot end side of the head-side frame.
Figure 20:
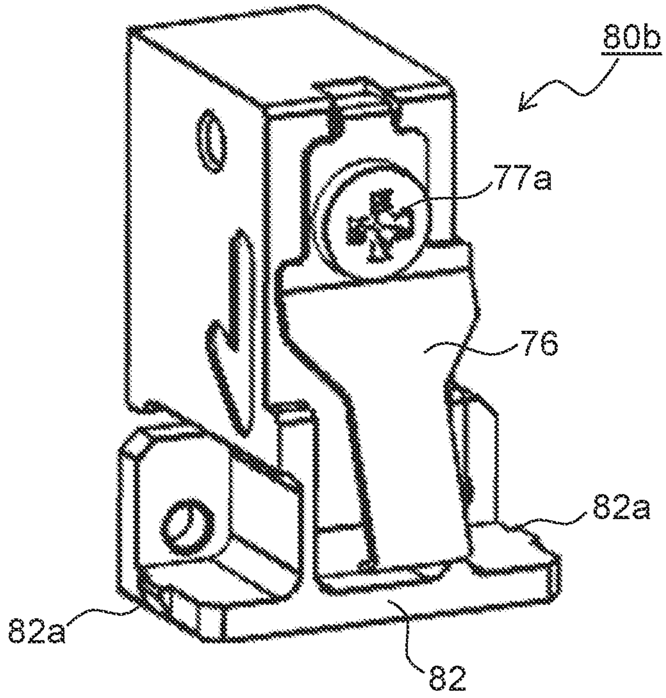
FIG. 20 is a perspective view for illustrating a state in which a flat spring is mounted to the second head mounting member to be arranged on the pivot end side of the head-side frame.

FIG. 19 is a perspective view of the second head mounting member 80*b* to be arranged on the pivot end side of the head-side frame 70. FIG. 20 is a perspective view for illustrating a state in which the flat spring 76 is mounted to the second head mounting member 80*b*. The second head mounting member 80*b* has a sliding portion 82 and screw holes 83*a* to 83*c*. The sliding portion 82 is a portion having an L-shape in side view and integrally formed on a lower side of the second head mounting member 80*b*, and a second angle adjustment screw 62 is threadedly inserted into a vertical portion of the L-shape. The sliding portion 82 slides along the flat portion 70*a* at the time of performing angle adjustment of the head-side frame 70 with the first angle adjustment screw 61 (see FIG. 14) and the second angle adjustment screw 62. Engagement claws 82*a* for mounting a sliding plate 90 (see FIG. 25) are formed at both end portions of the sliding portion 82 in the longitudinal direction.

Figure 23:
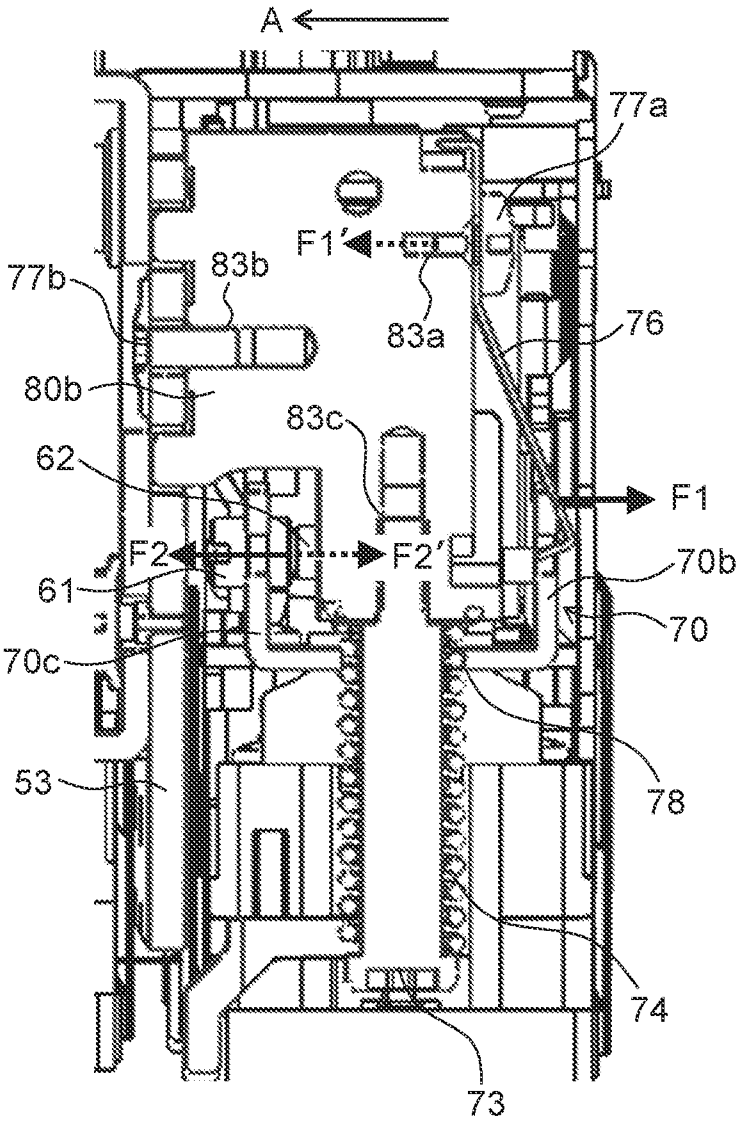
FIG. 23 is a side sectional view of the coupling portion between the pivot end side of the head-side frame and the unit frame taken along the direction orthogonal to the longitudinal direction, and is a sectional view including a flat spring.

The screw 77*a* for fixing the flat spring 76 to the second head mounting member 80*b* is fastened to the screw hole 83*a* (see FIG. 23). The screw 77*b* (see FIG. 23) for fixing the second head mounting member 80*b* to the main frame 53 is fastened to the screw hole 83*b*. The screw hole 83*c* is formed at a center of a lower surface of the sliding portion 82, and the head fixing pin 73 (see FIG. 23) for fixing the recording heads 17*a* to 17*c* is fastened to the screw hole 83*c*.

Figure 21:
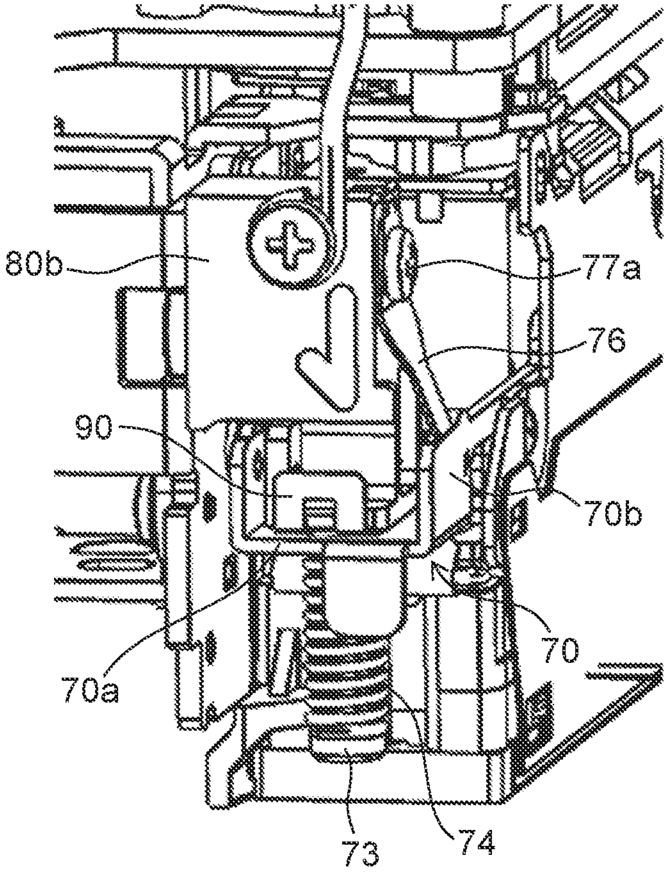
FIG. 21 is a perspective view for illustrating a configuration of a coupling portion between the pivot end side of the head-side frame and the unit frame.
Figure 22:
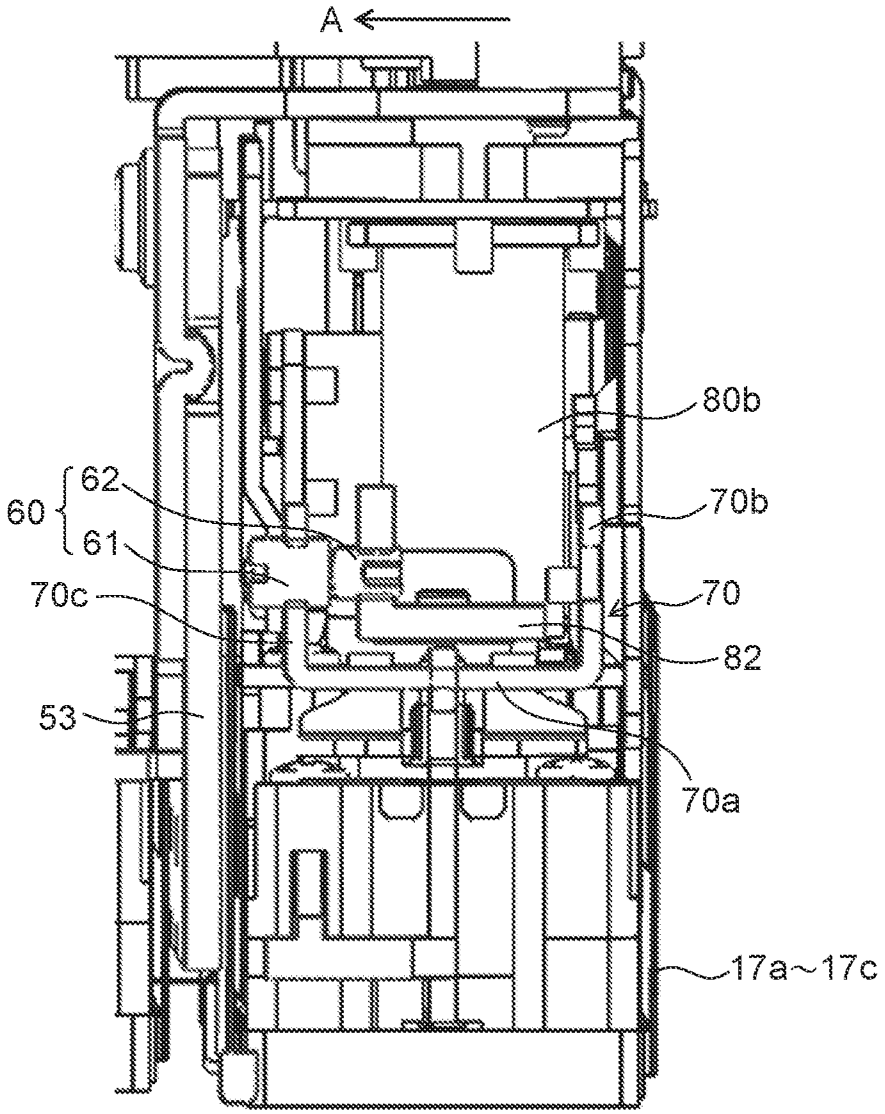
FIG. 22 is a side sectional view of the coupling portion between the pivot end side of the head-side frame and the unit frame taken along the direction orthogonal to the longitudinal direction, and is a sectional view including a head angle adjustment mechanism.
Figure 24:
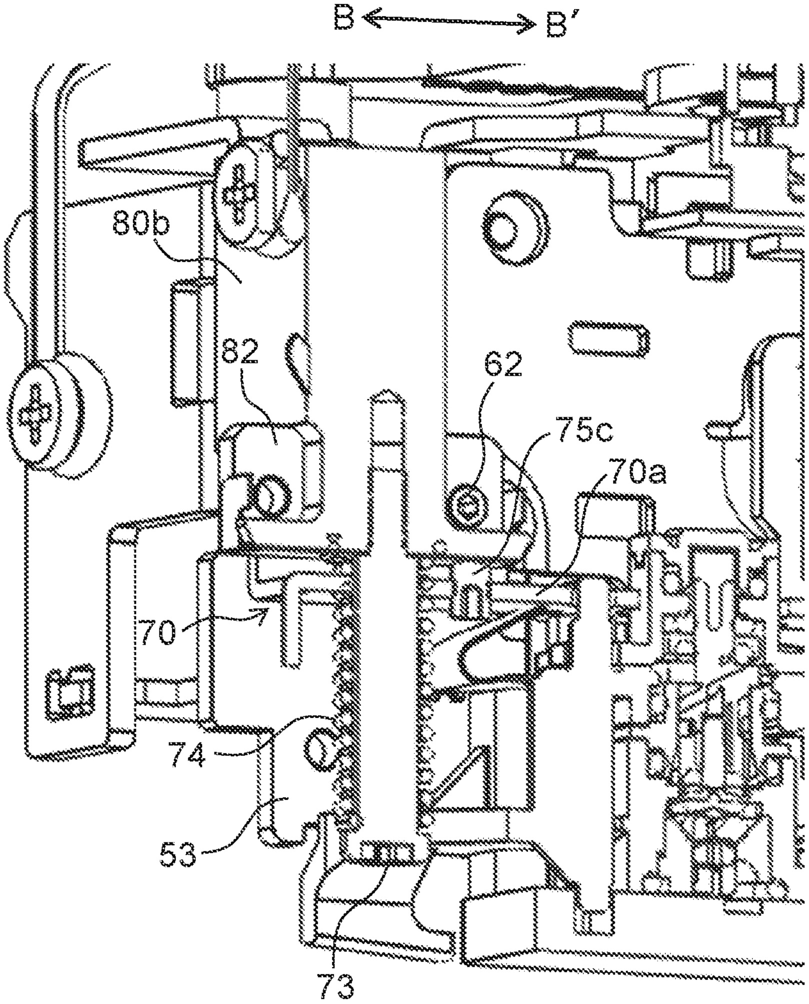
FIG. 24 is a side sectional view of the coupling portion between the pivot end side of the head-side frame and the unit frame taken along the longitudinal direction.

FIG. 21 is a perspective view for illustrating a configuration of a coupling portion between the pivot end side of the head-side frame 70 and the unit frame 52. FIG. 22 and FIG. 23 are each a side sectional view of the coupling portion between the pivot end side of the head-side frame 70 and the unit frame 52 taken along the direction orthogonal to the longitudinal direction. FIG. 22 and FIG. 23 are sectional views including the head angle adjustment mechanism 60 and the flat spring 76, respectively. FIG. 24 is aside sectional view of the coupling portion between the pivot end side of the head-side frame 70 and the unit frame 52 taken along the longitudinal direction.

As illustrated in FIG. 21 to 24, the head fixing pin 73 is fastened to the screw hole 83*c* of the second head mounting member 80*b* through an elongated head positioning hole 78 formed in the head-side frame 70. The head fixing spring 74 is sandwiched between the head fixing pin 73 and the head-side frame 70. In this manner, the head-side frame 70 is held in press-contact with the second head mounting member 80*b* by an urging force of the head fixing spring 74.

Further, a height adjustment screw 75*c* is threadedly inserted into the head-side frame 70 from below. When the height adjustment screw 75*c* is rotated in a forward direction (clockwise direction), the height adjustment screw 75*c* projects upward to push up a lower surface of the second head mounting member 80*b*. As a result, the head-side frame 70 moves downward against the urging force of the head fixing spring 74. When the height adjustment screw 75*c* is rotated in a reverse direction (counterclockwise direction), the height adjustment screw 75*c* retreats downward so that the head-side frame 70 moves upward by the urging force of the head fixing spring 74.

Through individual adjustment of the height adjustment screws 75*a* and 75*b* (see FIG. 18) on the pivot fulcrum side of the head-side frame 70 and the height adjustment screw 75*c*, a height and an angle of the recording heads 17*a* to 17*c* in a vertical direction can be adjusted. Two height adjustment screws 75*a* and 75*b* are provided on the pivot fulcrum side of the head-side frame 70, whereas only the height adjustment screw 75*c* is provided on the pivot end side of the head-side frame 70. This is because the flat portion 70*a* of the head-side frame 70 is positioned on a plane including distal ends of the height adjustment screws 75*a* to 75*c* (three points) by bringing the flat portion 70*a* into abutment against the distal ends of the height adjustment screws 75*a* to 75*c*.

Further, the head angle adjustment mechanism 60 is provided between the head-side frame 70 and the second head mounting member 80*b*. The head angle adjustment mechanism 60 includes the first angle adjustment screw 61 and the second angle adjustment screw 62. The first angle adjustment screw 61 is provided on an opposing surface of the side-surface portion 70*c* of the head-side frame 70 with respect to the sliding portion 82 of the second head mounting member 80*b*. The first angle adjustment screw 61 passes through the side-surface portion 70*c* in the vertical direction, and is reciprocally movable along the conveyance direction (arrow A direction) orthogonal to the support shaft boss 81. The first angle adjustment screw 61 is formed of, for example, a setscrew having a hexagonal hole or a slot at an end portion.

The second angle adjustment screw 62 is provided on an opposing surface of the sliding portion 82 of the second head mounting member 80*b* with respect to the side-surface portion 70*c* of the head-side frame 70. The second angle adjustment screw 62 passes through the sliding portion 82 in the vertical direction, and is reciprocally movable along the conveyance direction (arrow A direction) orthogonal to the support shaft boss 81. The second angle adjustment screw 62 is formed of, for example, a setscrew having a hexagonal hole or a slot at an end portion.

The first angle adjustment screw 61 and the second angle adjustment screw 62 are arranged at positions opposing each other in the conveyance direction (arrow A direction) orthogonal to the support shaft boss 81. More specifically, the first angle adjustment screw 61 and the second angle adjustment screw 62 are arranged at positions opposing each other in the longitudinal direction (sheet width direction, arrow BB' direction) and in the up-and-down direction of the head unit 51, and the first angle adjustment screw 61 and the second angle adjustment screw 62 reciprocally move on the same axis.

According to the configuration described above, at the time of assembly of the head unit 51, the second angle adjustment screws 62 of the second head mounting member 80*b* are adjusted in advance at predetermined positions. Then, after the first angle adjustment screws 61 of the recording heads 17*a* to 17*c* are adjusted to predetermined positions, the recording heads 17*a* to 17*c* are mounted to the unit frame 52. In this manner, in the case of replacing any one of the recording heads 17*a* to 17*c*, the operation of replacement can be completed by only removing the recording heads 17*a* to 17*c* for which replacement is required and thereafter mounting new recording heads 17*a* to 17*c* with the first angle adjustment screw 61 having been adjusted to the unit frame 52 with the second angle adjustment screw 62 having been adjusted. Thus, the alignment adjustment with respect to the unit frame 52 at the time of replacement of the recording heads 17*a* to 17*c* can easily be performed.

Further, the flat spring 76 is mounted on the side surface (right side surface in FIG. 23) of the second head mounting member 80*b* on the side opposite to the opposing surface with respect to the main frame 53. The upper end portion of the flat spring 76 is fixed by the screw 77*a* to the second head mounting member 80*b*, and the lower end portion of the flat spring 76 abuts against the inner side surface of the side-surface portion 70*b* of the head-side frame 70. In this manner, the head-side frame 70 is urged in the direction of separating away from the main frame 53 (direction of approaching the sliding portion 82) by the urging force of the flat spring 76, thereby being capable of maintaining a contact state between the first angle adjustment screw 61 and the second angle adjustment screw 62.

In this case, as illustrated in FIG. 23, the pressing force F1 acts on the head-side frame 70 from the flat spring 76 so that the force F1' acts on the second head mounting member 80*b* from the flat spring 76 as a counteraction of the pressing force Ft. Further, a pressing force F2 acts on the first angle adjustment screw 61 (side-surface portion 70*c*) from the second angle adjustment screw 62 so that a force F2' acts on the second angle adjustment screw 62 (second head mounting member 80*b*) from the first angle adjustment screw 61 as a counteraction of the pressing force F2. That is, a force relationship of the action and the counteraction is completed between the second head mounting member 80*b* and the head-side frame 70, and a force applied by the flat spring 76 does not directly act on the main frame 53. Thus, deformation of the main frame 53 can be prevented.

Figure 25:
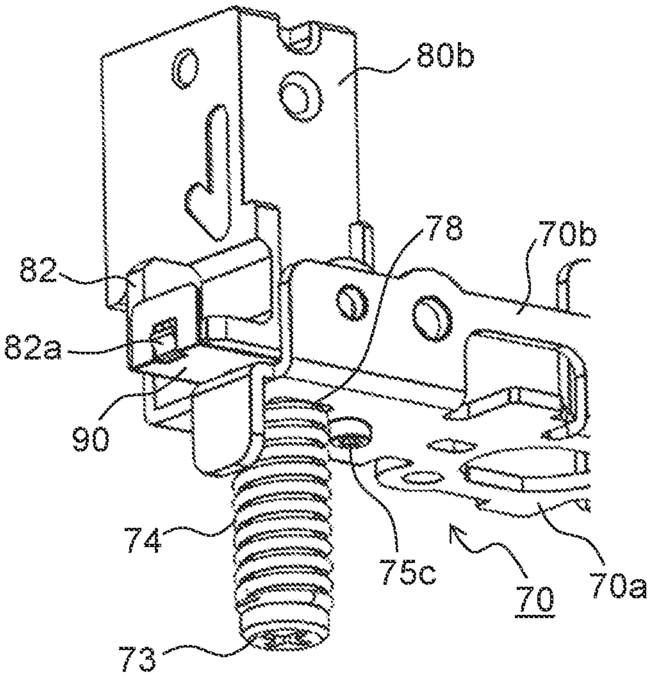
FIG. 25 is a perspective view for illustrating a state of coupling between the pivot end side of the head-side frame and the second head mounting member.
Figure 26:
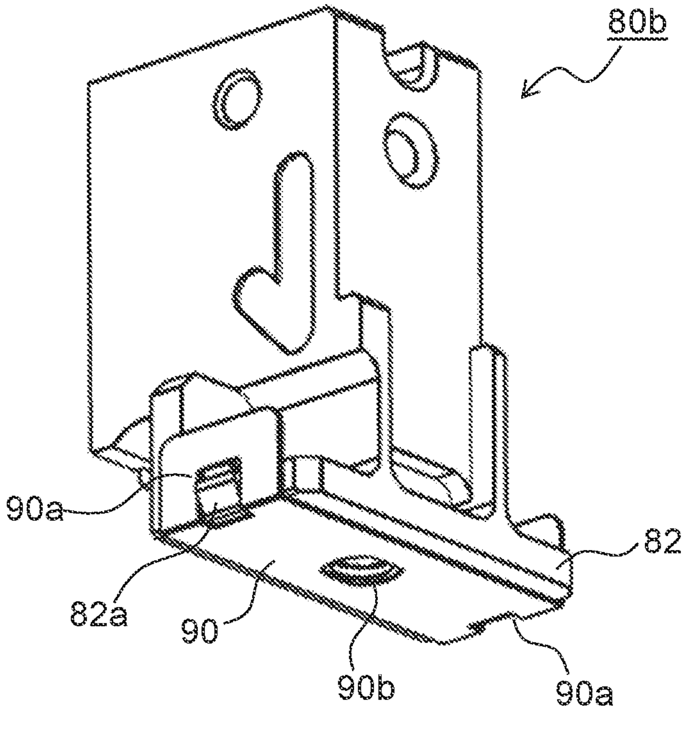
FIG. 26 is a perspective view for illustrating a state in which a sliding plate is mounted to a sliding portion of the second head mounting member.

FIG. 25 is a perspective view for illustrating a state of coupling between the pivot end side of the head-side frame 70 and the second head mounting member 80*b*. FIG. 26 is a perspective view for illustrating a state in which the sliding plate 90 is mounted to the sliding portion 82 of the second head mounting member 80*b*. As illustrated in FIG. 25, the head-side frame 70 is urged in the upward direction by the head fixing spring 74, and a distal end of the height adjustment screw 75*c* is held in press-contact with the lower surface of the sliding portion 82.

When a sliding load between the height adjustment screw 75*c* and the sliding portion 82 is large, the second head mounting member 80*b* does not smoothly move at the time of alignment adjustment of the recording heads 17*a* to 17*c* by the head angle adjustment mechanism 60, with the result that the alignment adjustment is hindered. In view of this, as illustrated in FIG. 25 and FIG. 26, the sliding plate 90 is mounted to the lower surface of the sliding portion 82 of the second head mounting member 80*b*.

The sliding plate 90 is a sheet metal member made of, for example, SUS (stainless steel), and both end portions of the sliding plate 90 in the longitudinal direction are bent upward. A pair of engaged portions 90*a* each formed of a rectangular opening are formed in the bend portions. The sliding plate 90 is mounted to the lower surface of the sliding portion 82 by engaging the engagement claws 82*a* of the sliding portion 82 with the engaged portions 90*a*. The sliding plate 90 is mounted to the second head mounting member 80*b* with backlash (play) in the up-and-down direction, and has such structure that the sliding plate 90 comes into close contact with the lower surface of the sliding portion 82 by mounting the head fixing pin 73 and the head fixing spring 74. The material of the sliding plate 90 is not limited to the SUS (stainless steel), and may be any material having a slidability and a rigidity greater than those of the second head mounting member 80*b*.

With the sliding plate 90 provided to the sliding portion 82, damage or dent on the second head mounting member 80*b* caused by contact with the height adjustment screw 75*c* can be prevented. Further, through the sliding of the height adjustment screw 75*c* and the sliding plate 90 at the time of the alignment adjustment of the recording heads 17*a* to 17*c* with the head angle adjustment mechanism 60, the sliding load between the height adjustment screw 75*c* and the sliding portion 82 is reduced, thereby improving the followability of the second head mounting member 80*b*. Thus, the alignment adjustment can be performed smoothly and accurately.

Further, the sliding plate 90 is mounted to the second head mounting member 80*b* with backlash (play). Thus, the sliding plate 90 can easily be mounted to the second head mounting member 80*b* regardless of the parts tolerance of the second head mounting member 80*b* and the sliding plate 90, thereby improving the ease of assembly operation. Further, with the engagement claws 82*a* provided on the second head mounting member 80*b* side and the engaged portions 90*a* provided on the sliding plate 90 side, at the time of removing the head fixing pin 73 and the head fixing spring 74 and solely replacing one of the recording heads 17*a* to 17*c*, the sliding plate 90 is held without falling off the second head mounting member 80*b*.

Figure 27:
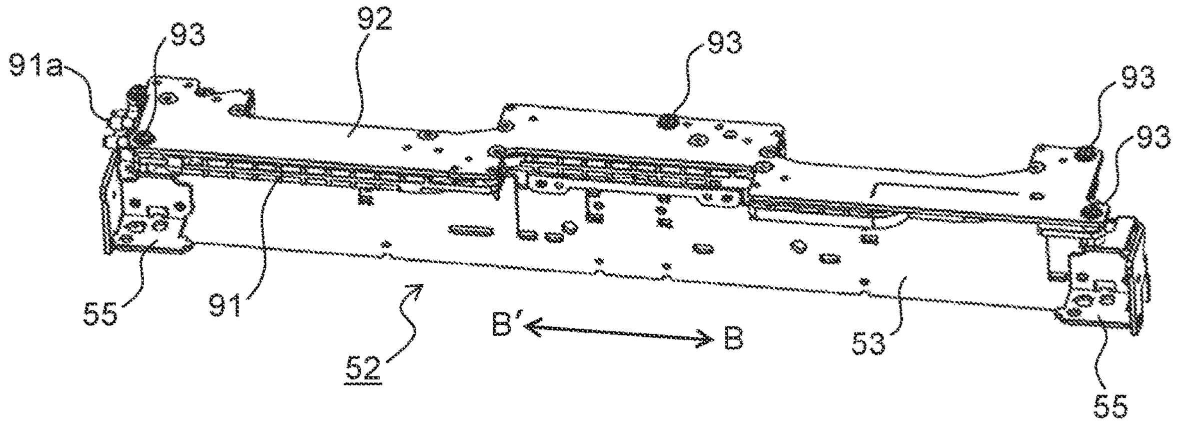
FIG. 27 is a perspective view of the unit frame to which a flow passage structure and a reinforcing sheet metal are mounted.
Figure 28:
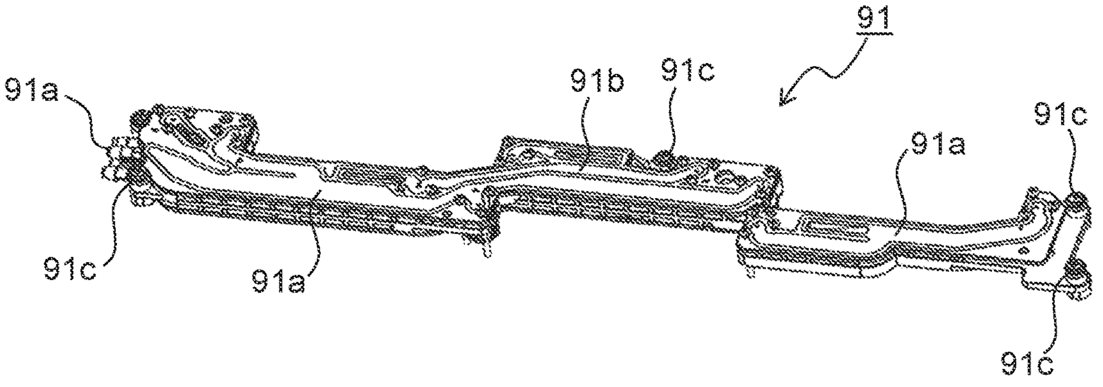
FIG. 28 is a perspective view of the flow passage structure.
Figure 29:
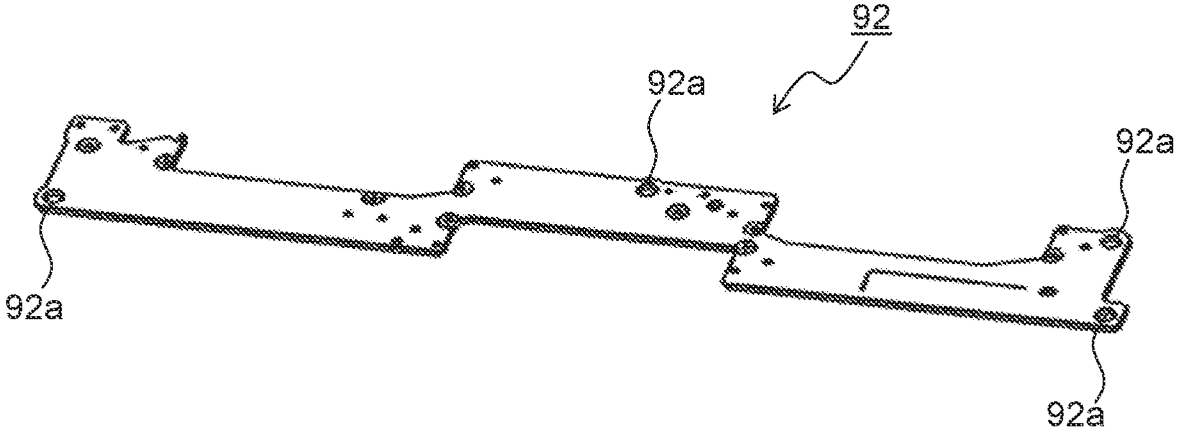
FIG. 29 is a perspective view of the reinforcing sheet metal.

FIG. 27 is a perspective view of the unit frame 52 to which the flow passage structure 91 and the reinforcing sheet metal 92 are mounted. FIG. 28 and FIG. 29 are perspective views of the flow passage structure 91 and the reinforcing sheet metal 92, respectively. As illustrated in FIG. 27, the flow passage structure 91 is placed on an upper portion of the unit frame 52, and the reinforcing sheet metal 92 is placed on an upper portion of the flow passage structure 91.

The flow passage structure 91 forms a flow passage of the ink and the cleaning liquid to be supplied to the recording heads 17*a* to 17*c*, and includes an outside connection port 91*a*, common flow passages 91*b*, and first insertion holes 91*c*. The outside connection port 91*a* is provided on a side surface of the flow passage structure 91 at one end portion in the longitudinal direction. For example, piping such as tubes connected to an ink tank and a cleaning liquid tank (none of which is shown), which are liquid supply mechanisms provided outside the head unit 51, is coupled to the outside connection port 91*a*.

The common flow passages 91*b* couple the outside connection port 91*a* and liquid supply ports (not shown) of the recording heads 17*a* to 17*c* to each other. The ink and the cleaning liquid having flowed in through the outside connection port 91*a* pass through the common flow passages 91*b* to be supplied to the recording heads 17*a* to 17*c*. The first insertion holes 91*c* are formed at positions overlapping the screw holes 58*a* (see FIG. 8 and FIG. 9) of the unit frame 52 (first reinforcing members 55 and second reinforcing member 57), and fixing screws 93 are inserted through the first insertion holes 91*c*.

The reinforcing sheet metal 92 is obtained by processing a metal plate into a predetermined shape (substantially the same shape as the flow passage structure 91). In the reinforcing sheet metal 92, second insertion holes 92*a* through which the fixing screws 93 are to be inserted are formed at positions overlapping the screw holes 58*a* of the unit frame 52 (first reinforcing members 55 and second reinforcing member 57).

Under a state in which the flow passage structure 91 and the reinforcing sheet metal 92 are laid in the stated order on the upper portion of the unit frame 52, the fixing screws 93 are inserted through the second insertion holes 92*a* and the first insertion holes 91*c* and fastened to the screw holes 58*a*. In this manner, the flow passage structure 91 and the reinforcing sheet metal 92 are fixed to the unit frame 52.

Figure 30:
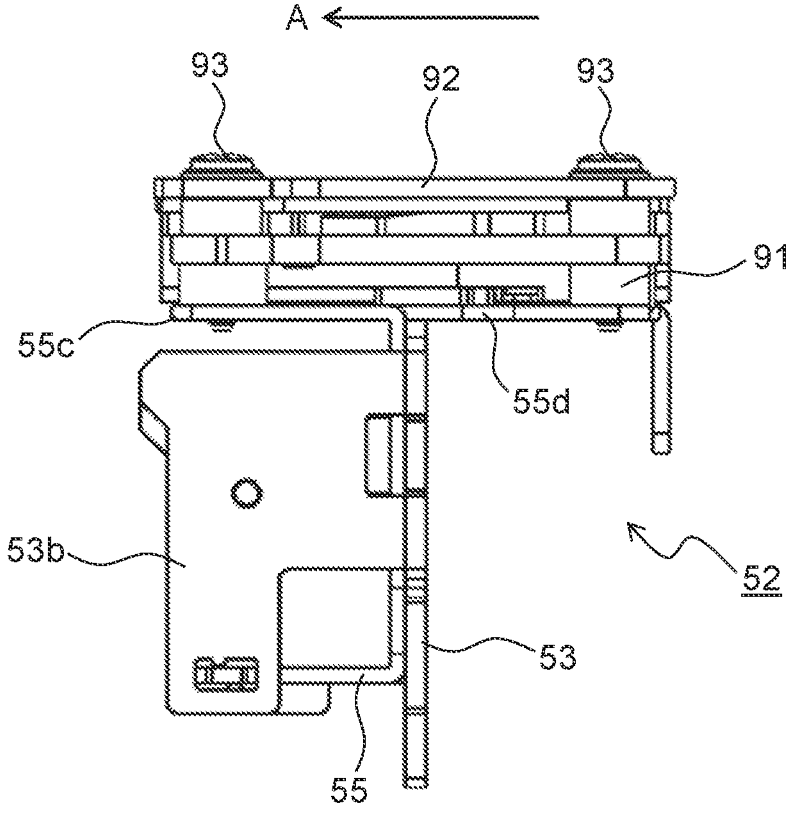
FIG. 30 is a side view of the unit frame to which the flow passage structure and the reinforcing sheet metal are mounted, as seen from one side in the longitudinal direction.

FIG. 30 is a side view of the unit frame 52 to which the flow passage structure 91 and the reinforcing sheet metal 92 are mounted, as seen from one side in the longitudinal direction. As illustrated in FIG. 30, when the reinforcing sheet metal 92 is mounted on the upper portion of the unit frame 52, the unit frame 52 is formed into a structure having a T-shape in side view (as seen in the direction perpendicular to the drawing sheet of FIG. 30) over an entire region in the longitudinal direction, with the main frame 53 extending perpendicularly along the longitudinal direction (arrow BB' direction) and the reinforcing sheet metal 92 extending horizontally. With this configuration, the unit frame 52 is less liable to be deformed in the direction (arrow A direction) orthogonal to the longitudinal direction, thereby increasing the rigidity. Further, the flow passage structure 91 is sandwiched between the unit frame 53 and the reinforcing sheet metal 92, thereby being capable of increasing the strength of the flow passage structure 91.

Further, in this embodiment, the outside connection portion 91*a* which allows the ink and the cleaning liquid to flow into the common flow passages 91*b* is provided on the side surface of the flow passage structure 91. With this configuration, as compared to the case in which the outside connection port 91*a* is provided on an upper surface of the flow passage structure 91, it is not required that an opening for allowing insertion of the outside connection port 91*a* be provided to the reinforcing sheet metal 92, thereby increasing a contact area between the flow passage structure 91 and the reinforcing sheet metal 92. Thus, the rigidity of the unit frame 52 can be further increased.

According to the configuration of this embodiment, the head unit 51 includes a plurality of (three in this embodiment) recording heads 17*a* to 17*c* arranged side by side on both sides of the unit frame 52. According to this configuration, for example, when there is need for replacing one recording head 17*a*, the other two recording heads 17*b* and 17*c* can continuously be used without replacement. Thus, reduction in cost of the head unit 51 can be achieved.

Further, the unit frame 52 is formed of the main frame 53, the first reinforcing members 55, and the second reinforcing member 57. The main frame 53 has a plate shape and extends in the sheet width direction (BB' direction). The first reinforcing members 55 and the second reinforcing member 57 are configured to reinforce the main frame 53. The first reinforcing members 55 each have an L-shape, and are mounted at the bent portions 53*a* having an L-shape which are formed at the both end portions of the main frame 53. In this case, the first reinforcing members 55 are each mounted to the main frame 53 such that the bend portion defined between the main body portion 53*a* and the bent portion 53*b* of the main frame 53 and the bend portion defined between the side wall portion 55*a* and the bottom surface portion 55*b* of the first reinforcing member 55 are perpendicular to each other, thereby being capable of increasing the rigidity in the up-and-down direction and the width direction at the both end portions of the unit frame 52. Further, the first engagement protrusions 56*a* and 56*b* and the second engagement protrusion 56*c* of the first reinforcing members 55 are inserted into the engagement holes 53*e* of the main body portion 53*a* and the bent portions 53*b* of the main frame 53, thereby being capable of firmly fixing the main frame 53 and the first reinforcing member 55.

Further, the printer 100 includes the head unit 51 having the configuration described above, which is configured to record an image on the sheet S. According to this configuration, in the printer 100, only any of the recording heads 17*a* to 17*c* having failure can be replaced individually. Thus, the printer 100 has a configuration which is reduced in cost.

Besides, the present disclosure is not limited to the embodiment described above, and various modifications can be made within the scope not departing from the gist of the present disclosure. For example, in the embodiment described above, description has been given of the configuration in which three recording heads 17*a* to 17*c* are mounted to one head unit 51. However, there may also be employed a configuration in which two or four or more recording heads are mounted to the head unit 51.

The present disclosure is applicable to a head unit including a removable recording head or to an inkjet recording apparatus such as an inkjet printer including the head unit.

What is claimed is:

1. A head unit, comprising:

a recording head including a plurality of nozzles configured to eject ink onto a recording medium; and a unit frame which includes a main frame extending along a width direction orthogonal to a conveyance direction of the recording medium, and is configured to hold one or more recording heads on both side surfaces of the main frame, wherein the main frame includes:

a main body portion having a flat-plate shape and standing along the width direction; and bent portions formed by perpendicularly bending both end portions of the main body portion in the width direction, wherein the unit frame includes a pair of reinforcing members provided at the bent portions, wherein the reinforcing members each include:

a side wall portion opposed to the main body portion and a bottom surface portion provided so as to extend in a horizontal direction from a lower end portion of the side wall portion, and are fixed to the main frame under a state in which a side end edge of the side wall portion is arranged along a bend portion defined between the main body portion and the bent portion and in which a side end edge of the bottom surface portion is arranged along an inner side surface of the bent portion, a first engagement protrusion projecting from a side end edge of the bottom surface portion; and a second engagement protrusion projecting from a lower end portion of the side wall portion on a side opposite to the bottom surface portion, and wherein, when the reinforcing members are each fixed to the main frame, the first engagement protrusion and the second engagement protrusion are engaged with engagement holes formed in the bent portion and the main body portion, respectively.

2. The head unit according to claim 1, wherein the pair of reinforcing members have the same shape, and the first engagement protrusions project from side end edges on one end side and another end side of the bottom surface portion.

3. The head unit according to claim 1, wherein the unit frame is supported so as to be pivotable with respect to a main body frame with one end side in a longitudinal direction as a pivot fulcrum, and a pressing member configured to press the unit frame toward a pivot end side is arranged adjacent to the unit frame on the main body frame, wherein the reinforcing members each have a unit positioning hole formed in the bottom surface portion to be engaged with a support shaft of the main body frame, and wherein the unit positioning hole has two sides adjacent to each other over an apex at a predetermined angle, and when the unit frame is pressed by the pressing member, the two sides of the unit positioning hole is brought into press-contact with the support shaft.

4. The head unit according to claim 1, wherein the main frame has a flow passage structure and a reinforcing sheet metal fixed on an upper portion thereof, the flow passage structure forming a flow passage of a liquid to be supplied to the recording head, the reinforcing sheet metal being arranged on an upper surface of the flow passage structure, and wherein the unit frame is formed into a structure having a T-shape in side view over an entire region in a longitudinal direction, with the main frame extending perpendicularly along the width direction and the reinforcing sheet metal extending horizontally.

5. The head unit according to claim 4, wherein the flow passage structure includes:

an outside connection port configured to allow a liquid to flow in from an outside; and a common flow passage coupling the outside connection port and the recording head to each other, and wherein the outside connection port is provided on a side surface of the flow passage structure.

6. The head unit according to claim 4, wherein the reinforcing members each include a first coupling piece and a second coupling piece provided so as to extend in a horizontal direction from an upper end portion of the side wall portion toward the bottom surface portion side and a side opposite to the bottom surface portion, and wherein the flow passage structure and the reinforcing sheet metal are fixed by screw to the first coupling piece and the second coupling piece.

7. An inkjet recording apparatus comprising the head unit of claim 1.

8. A head unit, comprising:

a recording head including a plurality of nozzles configured to eject ink onto a recording medium; and a unit frame which includes a main frame extending along a width direction orthogonal to a conveyance direction of the recording medium, and is configured to hold one or more recording heads on both side surfaces of the main frame, wherein the main frame includes:

a main body portion having a flat-plate shape and standing along the width direction; and bent portions formed by perpendicularly bending both end portions of the main body portion in the width direction, wherein the unit frame includes a pair of reinforcing members provided at the bent portions, wherein the reinforcing members each include a side wall portion opposed to the main body portion and a bottom surface portion provided so as to extend in a horizontal direction from a lower end portion of the side wall portion, and are fixed to the main frame under a state in which a side end edge of the side wall portion is arranged along a bend portion defined between the main body portion and the bent portion and in which a side end edge of the bottom surface portion is arranged along an inner side surface of the bent portion, wherein the reinforcing members each include a first engagement protrusion projecting from the side end edge of the bottom surface portion, and wherein the pair of reinforcing members have the same shape, and the first engagement protrusions project from side end edges on one end side and another end side of the bottom surface portion.

9. A head unit, comprising:

a recording head including a plurality of nozzles configured to eject ink onto a recording medium; and a unit frame which includes a main frame extending along a width direction orthogonal to a conveyance direction of the recording medium, and is configured to hold one or more recording heads on both side surfaces of the main frame, wherein the main frame includes:

a main body portion having a flat-plate shape and standing along the width direction; and bent portions formed by perpendicularly bending both end portions of the main body portion in the width direction, wherein the unit frame includes a pair of reinforcing members provided at the bent portions, wherein the reinforcing members each include a side wall portion opposed to the main body portion and a bottom surface portion provided so as to extend in a horizontal direction from a lower end portion of the side wall portion, and are fixed to the main frame under a state in which a side end edge of the side wall portion is arranged along a bend portion defined between the main body portion and the bent portion and in which a side end edge of the bottom surface portion is arranged along an inner side surface of the bent portion, wherein the main frame has a flow passage structure and a reinforcing sheet metal fixed on an upper portion thereof, the flow passage structure forming a flow passage of a liquid to be supplied to the recording head, the reinforcing sheet metal being arranged on an upper surface of the flow passage structure, and wherein the unit frame is formed into a structure having a T-shape in side view over an entire region in a longitudinal direction, with the main frame extending perpendicularly along the width direction and the reinforcing sheet metal extending horizontally.

10. The head unit according to claim 9, wherein the flow passage structure includes:

an outside connection port configured to allow a liquid to flow in from an outside; and a common flow passage coupling the outside connection port and the recording head to each other, and wherein the outside connection port is provided on a side surface of the flow passage structure.

11. The head unit according to claim 9, wherein the reinforcing members each include a first coupling piece and a second coupling piece provided so as to extend in a horizontal direction from an upper end portion of the side wall portion toward the bottom surface portion side and a side opposite to the bottom surface portion, and wherein the flow passage structure and the reinforcing sheet metal are fixed by screw to the first coupling piece and the second coupling piece.

* * * * *